United States Patent [19]
Webb et al.

[11] Patent Number: 5,347,617
[45] Date of Patent: Sep. 13, 1994

[54] PRINTER HAVING A MULTIPLE SCAN LINE PRINTHEAD CONTROLLER

[75] Inventors: David R. Webb, Westlake Village; Yuen W. Wong, Glendale; Werner Loewenthal, North Hollywood; Stan D. Shurygailo, El Segundo, all of Calif.

[73] Assignee: Dataproducts Corporation, Woodland Hills, Calif.

[21] Appl. No.: 613,327

[22] Filed: Nov. 9, 1990

[51] Int. Cl.$^5$ ............................................. G06K 15/00
[52] U.S. Cl. ..................................... 395/108; 395/115
[58] Field of Search ........ 395/108, 115, 116, 164–166; 346/154, 76 PH, 136; 358/444, 261.4, 296

[56] References Cited

U.S. PATENT DOCUMENTS

| | | | |
|---|---|---|---|
| 4,510,506 | 4/1985 | Moriguchi et al. | 346/136 |
| 4,513,661 | 4/1985 | Melissa et al. | 395/108 |
| 4,683,818 | 8/1987 | Hewlett, Jr. | 395/108 |
| 4,746,941 | 5/1988 | Pham et al. | 395/108 |
| 4,769,648 | 9/1988 | Kishino et al. | 395/108 |
| 4,871,270 | 10/1989 | Werbach | 395/108 |
| 4,882,686 | 11/1989 | Gretter | 395/108 |
| 4,918,624 | 4/1990 | Moore et al. | 395/108 |
| 4,922,271 | 5/1990 | Nilsson et al. | 395/108 |
| 4,929,099 | 5/1990 | Graham et al. | 395/108 |
| 5,032,923 | 7/1991 | Kurtin et al. | 395/108 |

FOREIGN PATENT DOCUMENTS

| | | | |
|---|---|---|---|
| 0031421 | 7/1981 | European Pat. Off. | 395/108 |
| 0066729A1 | 12/1982 | European Pat. Off. | 395/108 |
| 0211269A2 | 2/1987 | European Pat. Off. | 395/108 |
| 0227106A2 | 7/1987 | European Pat. Off. | 395/108 |
| 56-109765 | 2/1980 | Japan | 395/108 |
| 023317A2 | 12/1979 | United Kingdom | 395/108 |
| 010633B2 | 4/1982 | United Kingdom | 395/108 |

Primary Examiner—Arthur G. Evans
Attorney, Agent, or Firm—Spensley Horn Jubas & Lubitz

[57] ABSTRACT

A printer accesses from a bit mapped raster matrix of an image to be printed, a group of bits corresponding in number to the number of printing elements of the printhead. This group of bits is used to drive the printing elements of the printhead so as to print the image. In the printers having raster scanning printheads, the selected groups of bits are accessed from the bit mapped raster matrix synchronously with the raster scanning of the printhead.

6 Claims, 52 Drawing Sheets

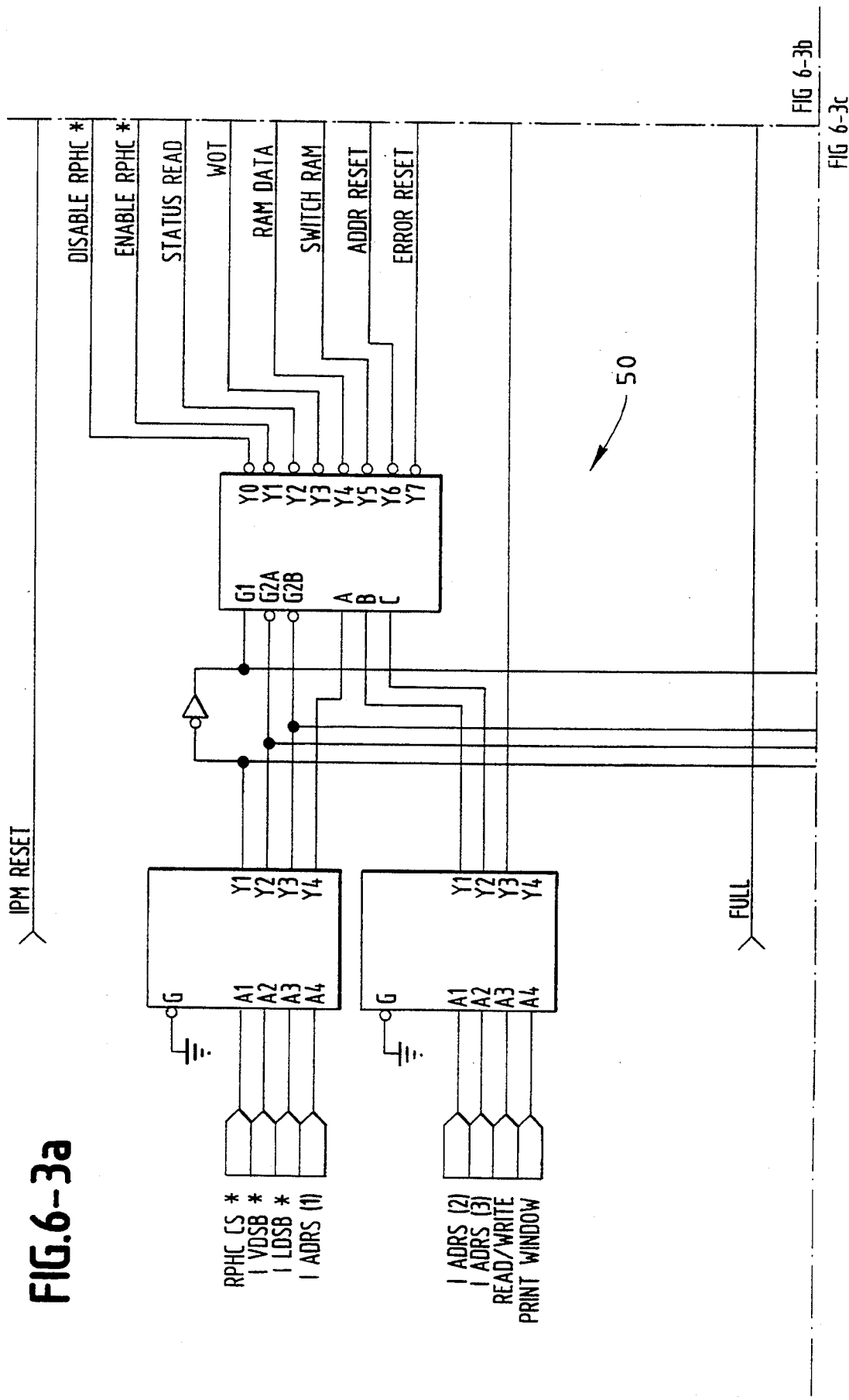

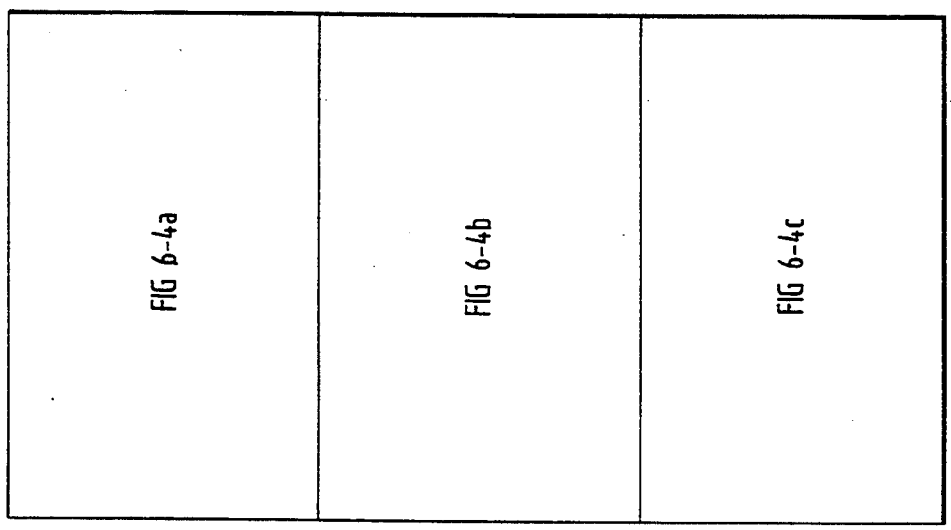

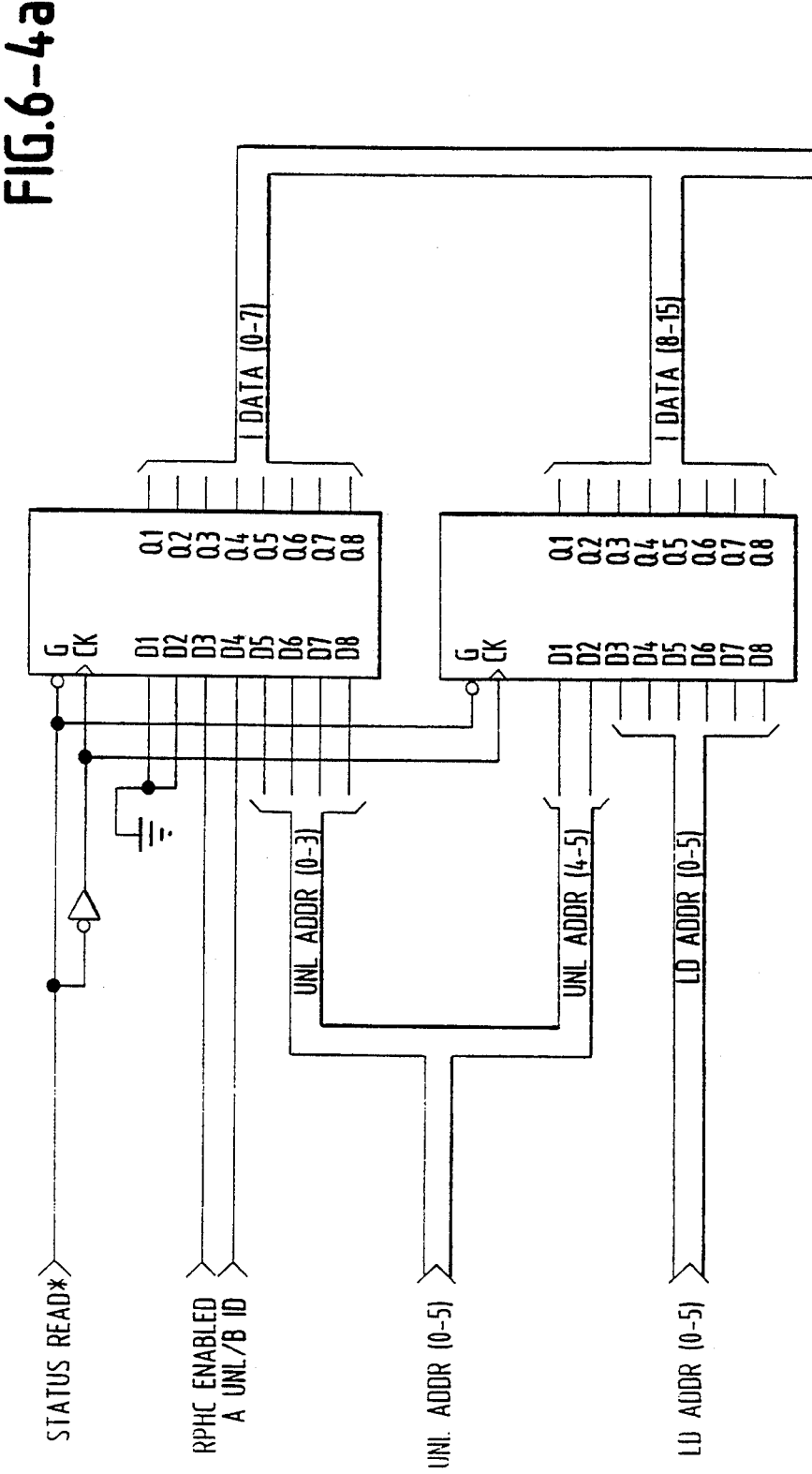

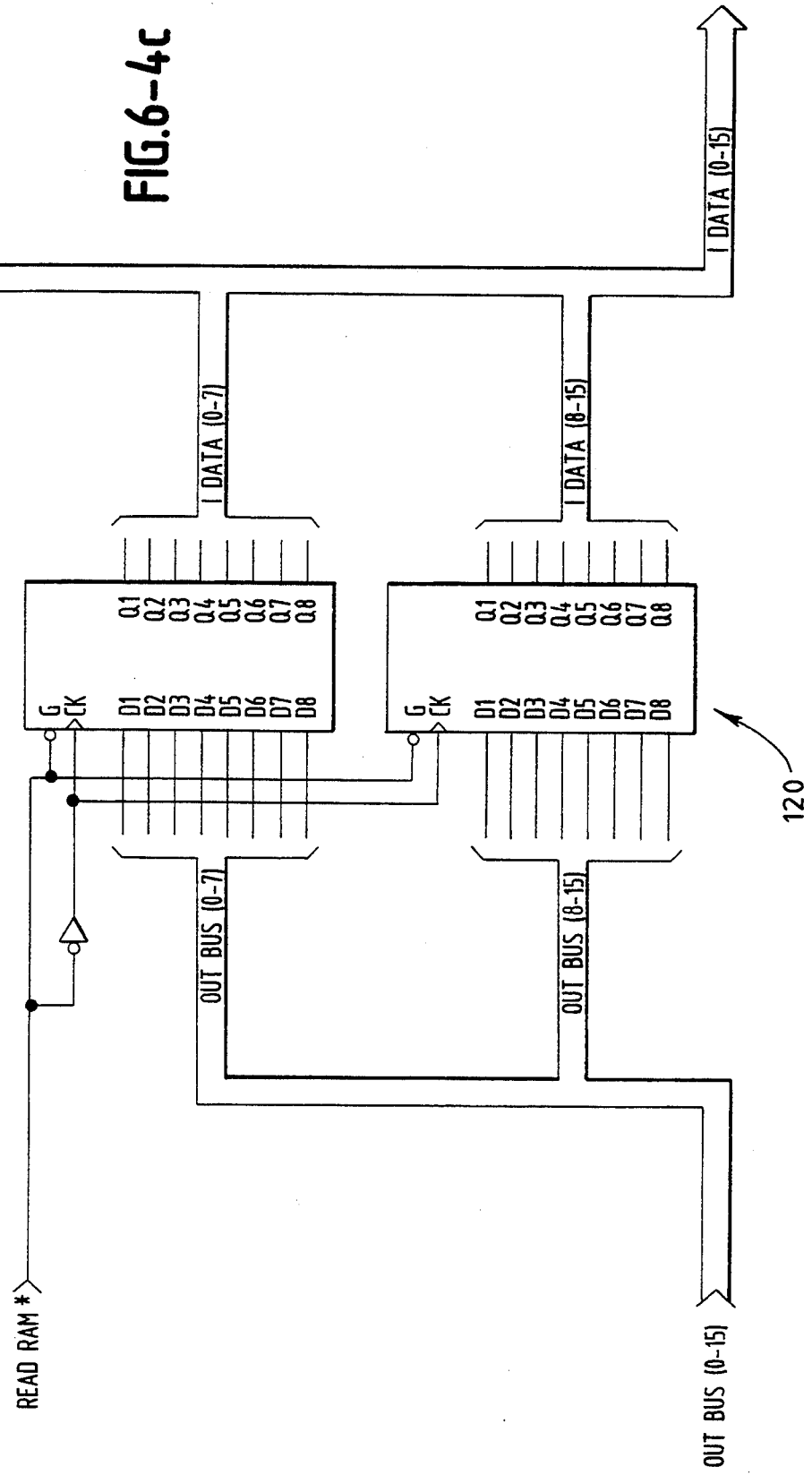

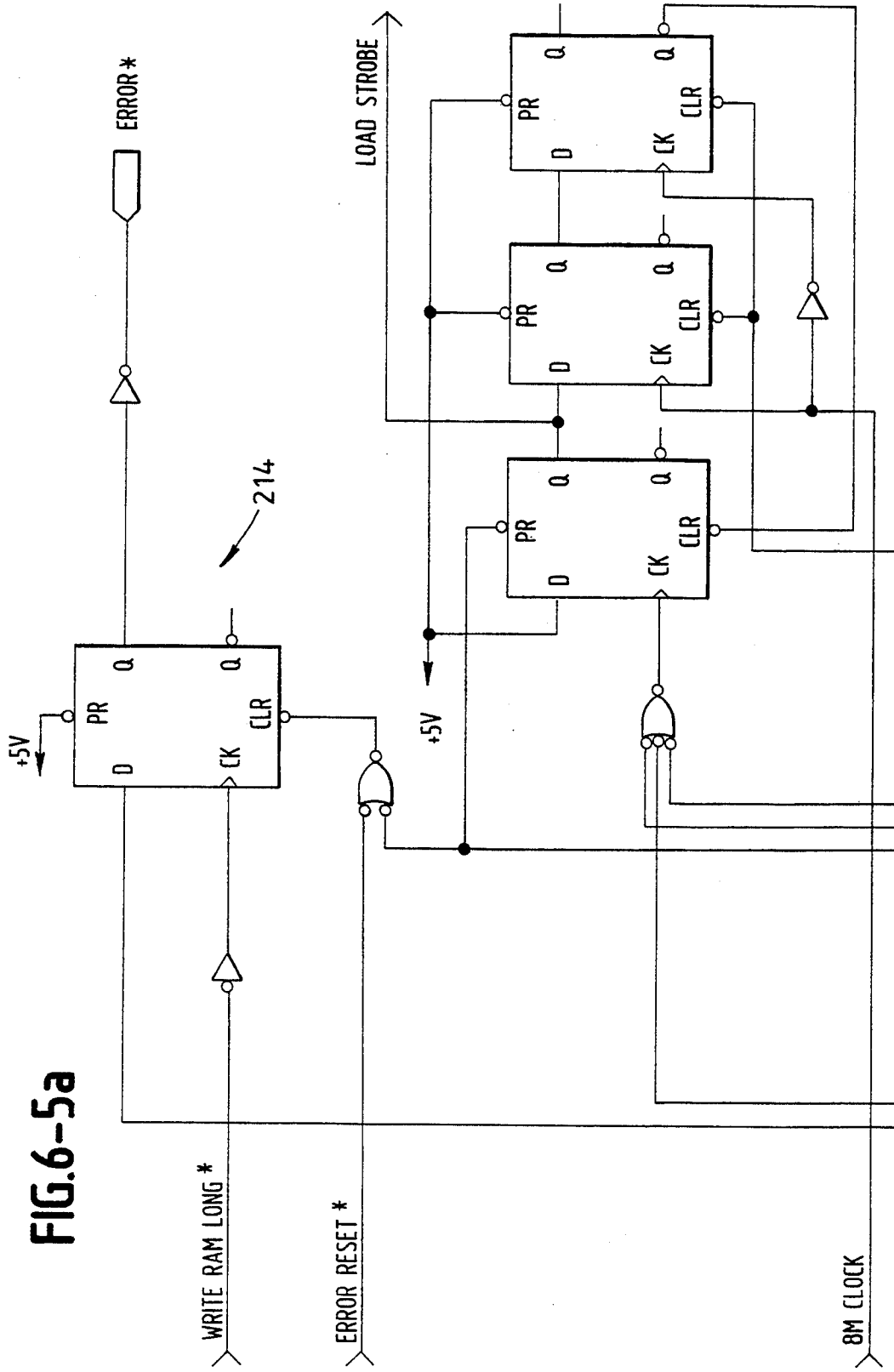

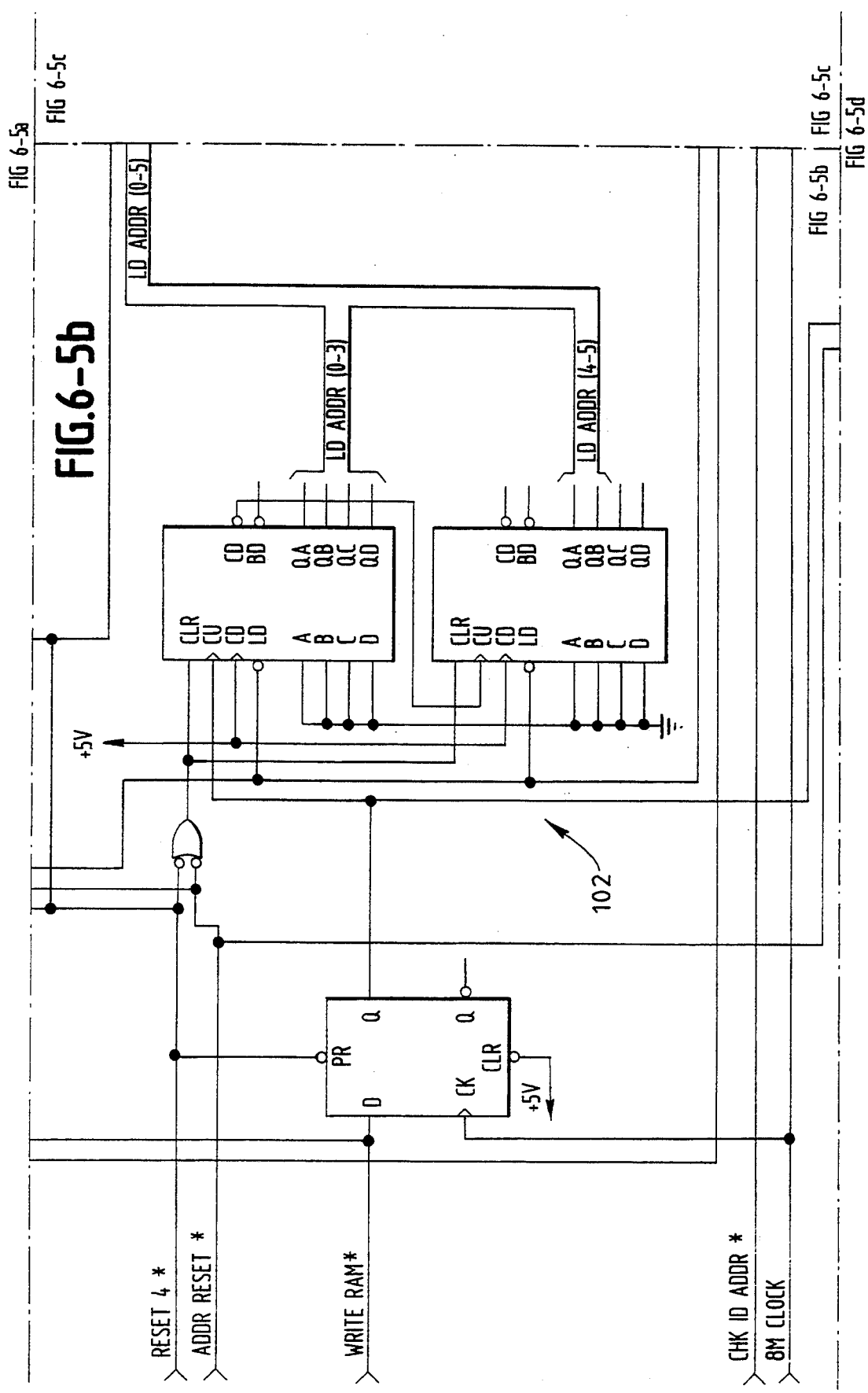

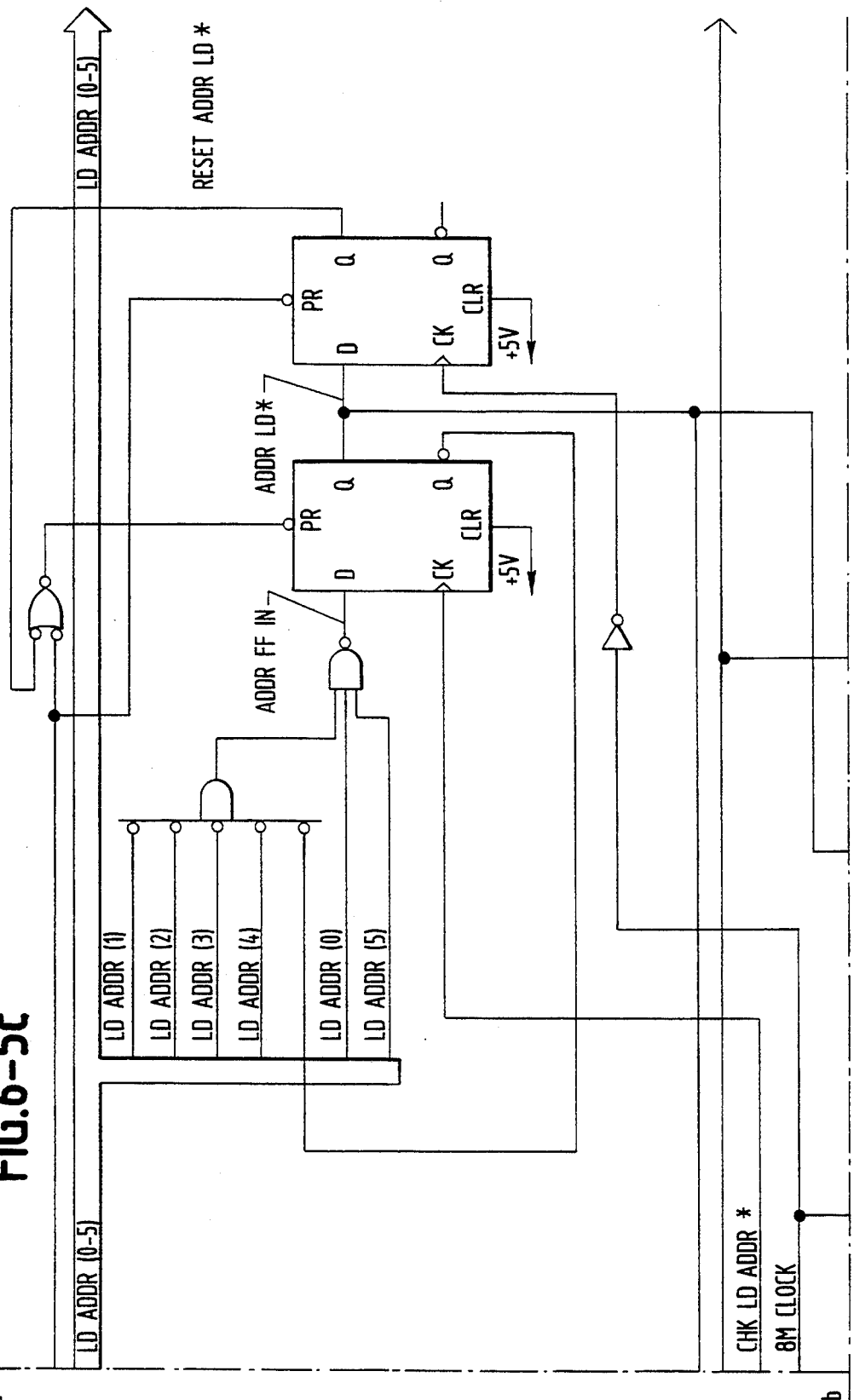

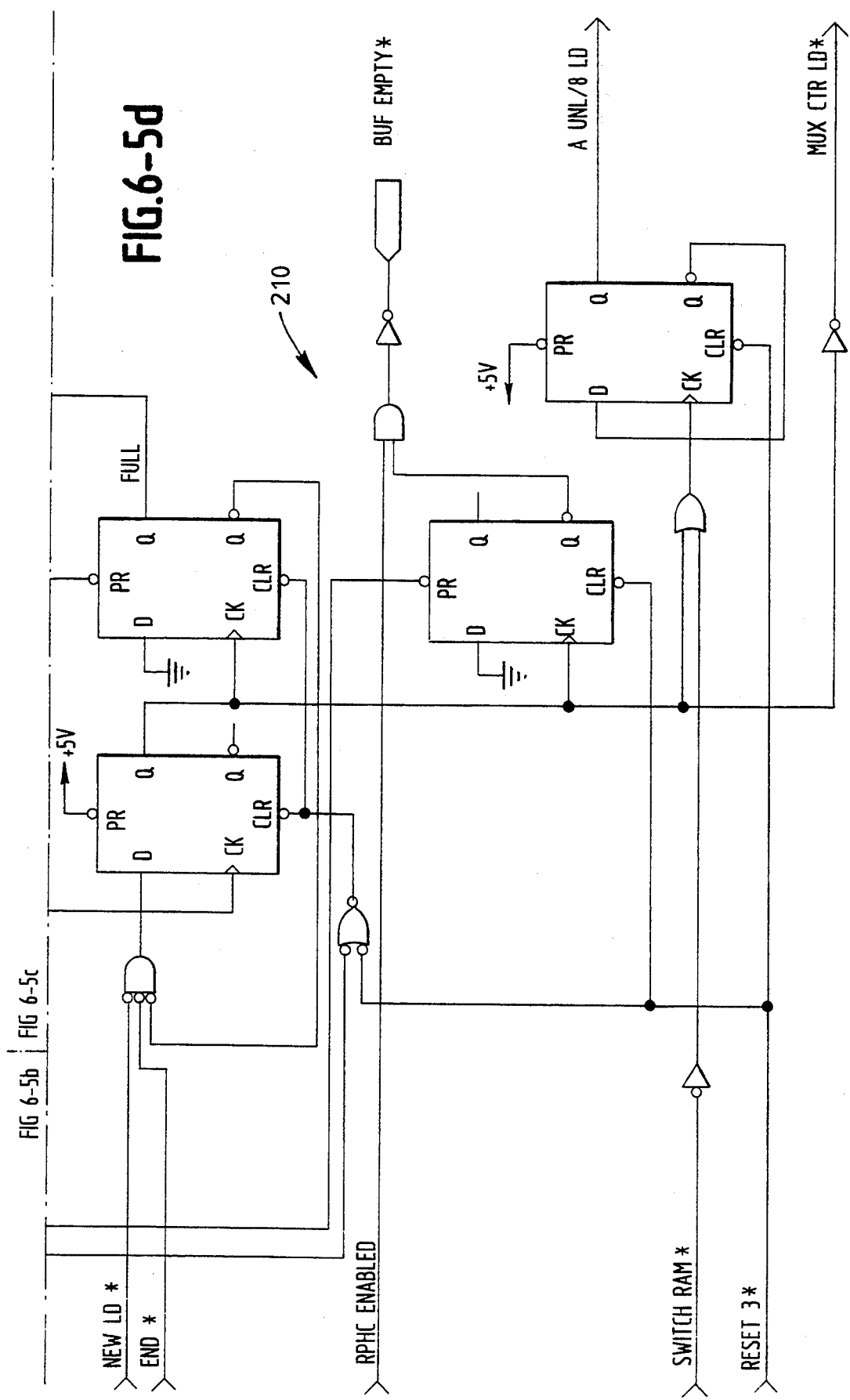

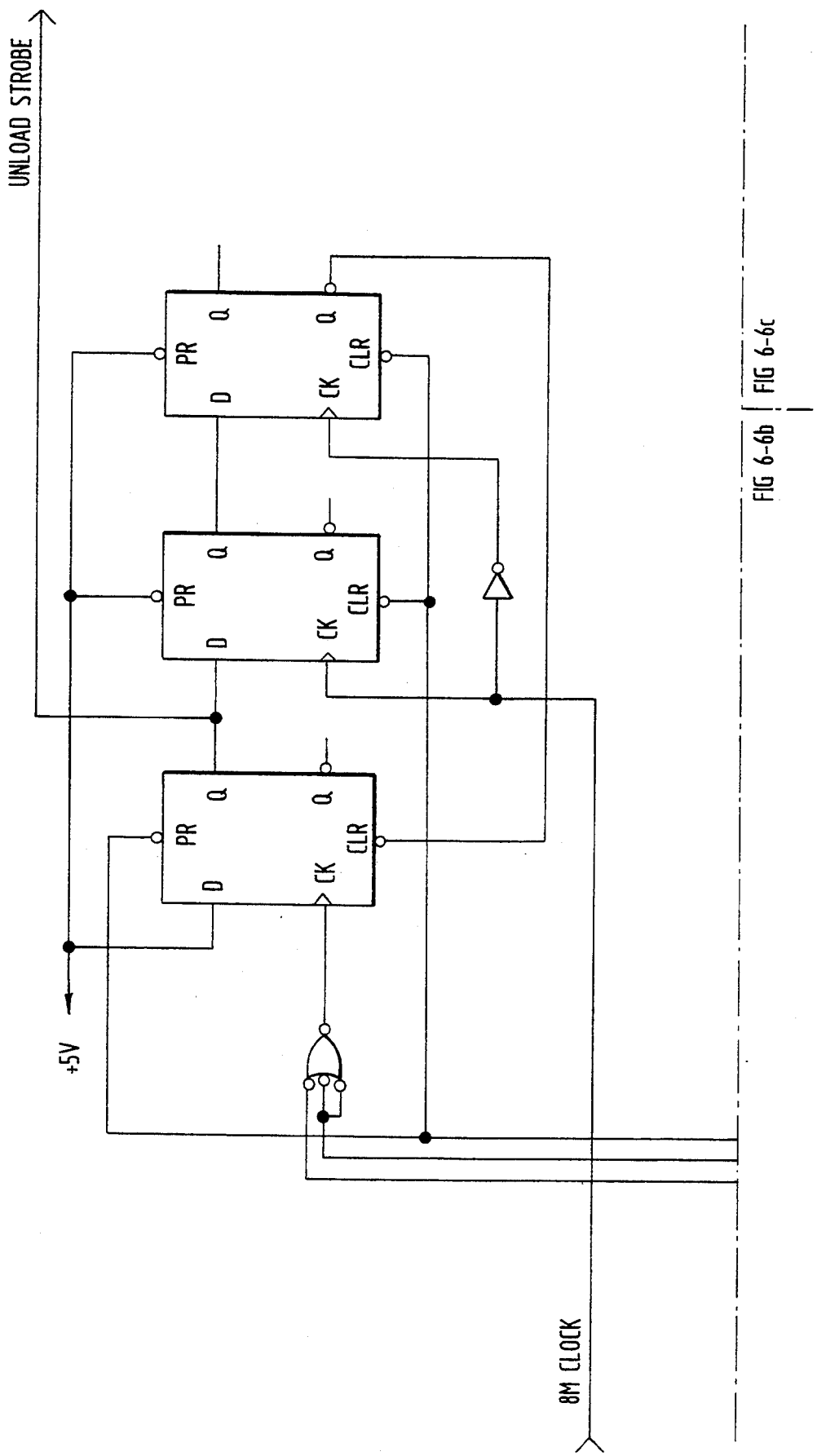

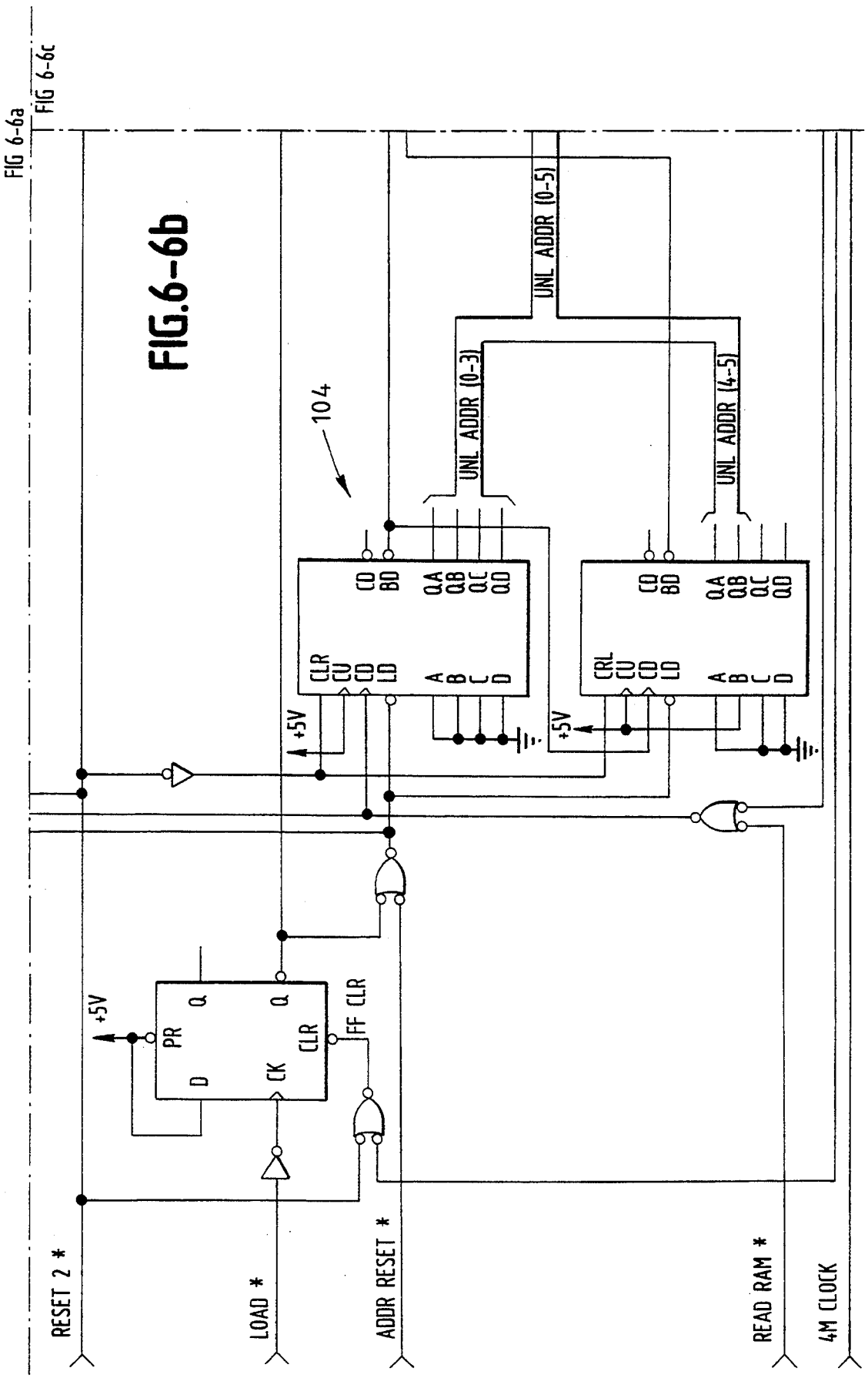

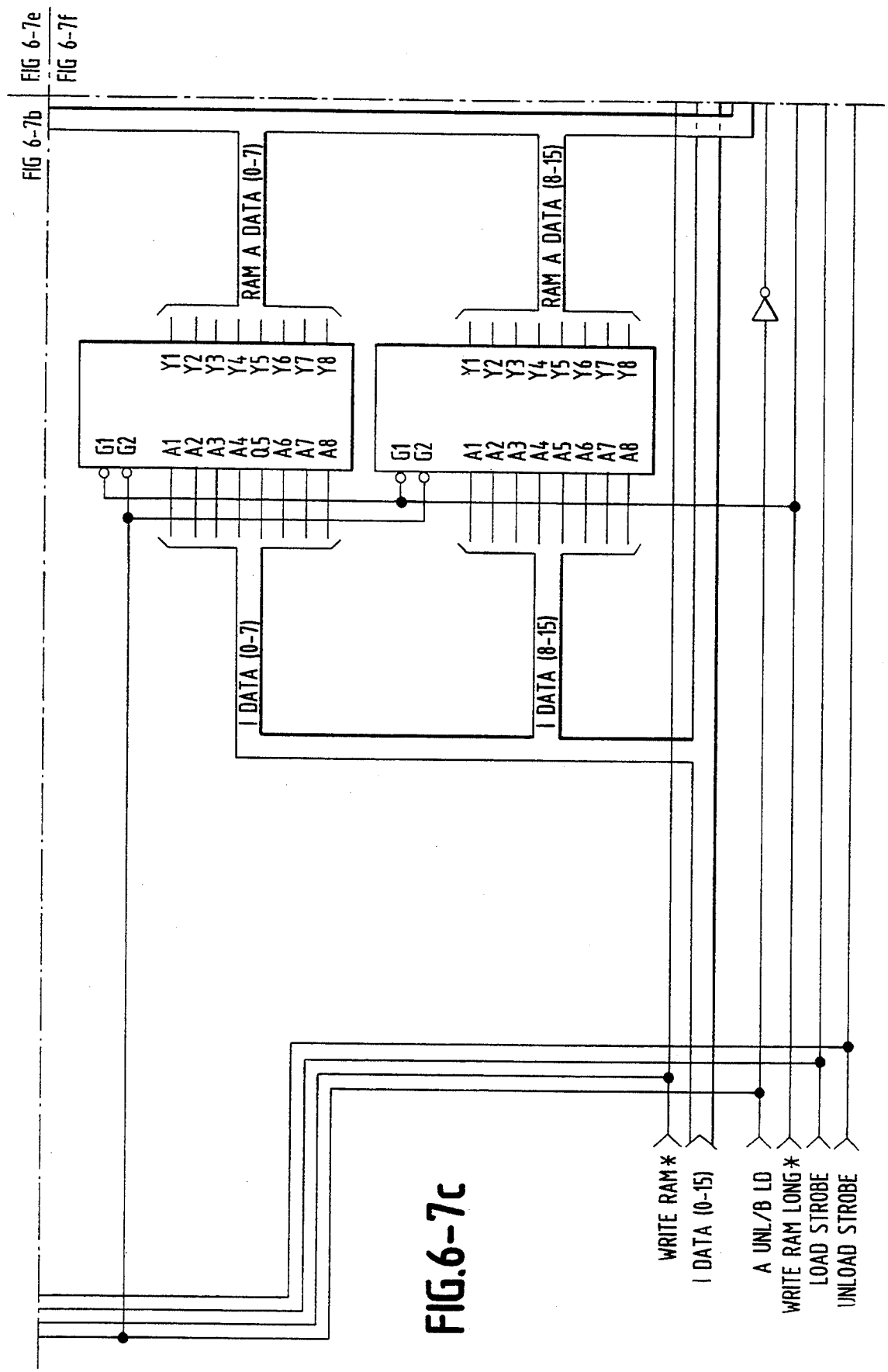

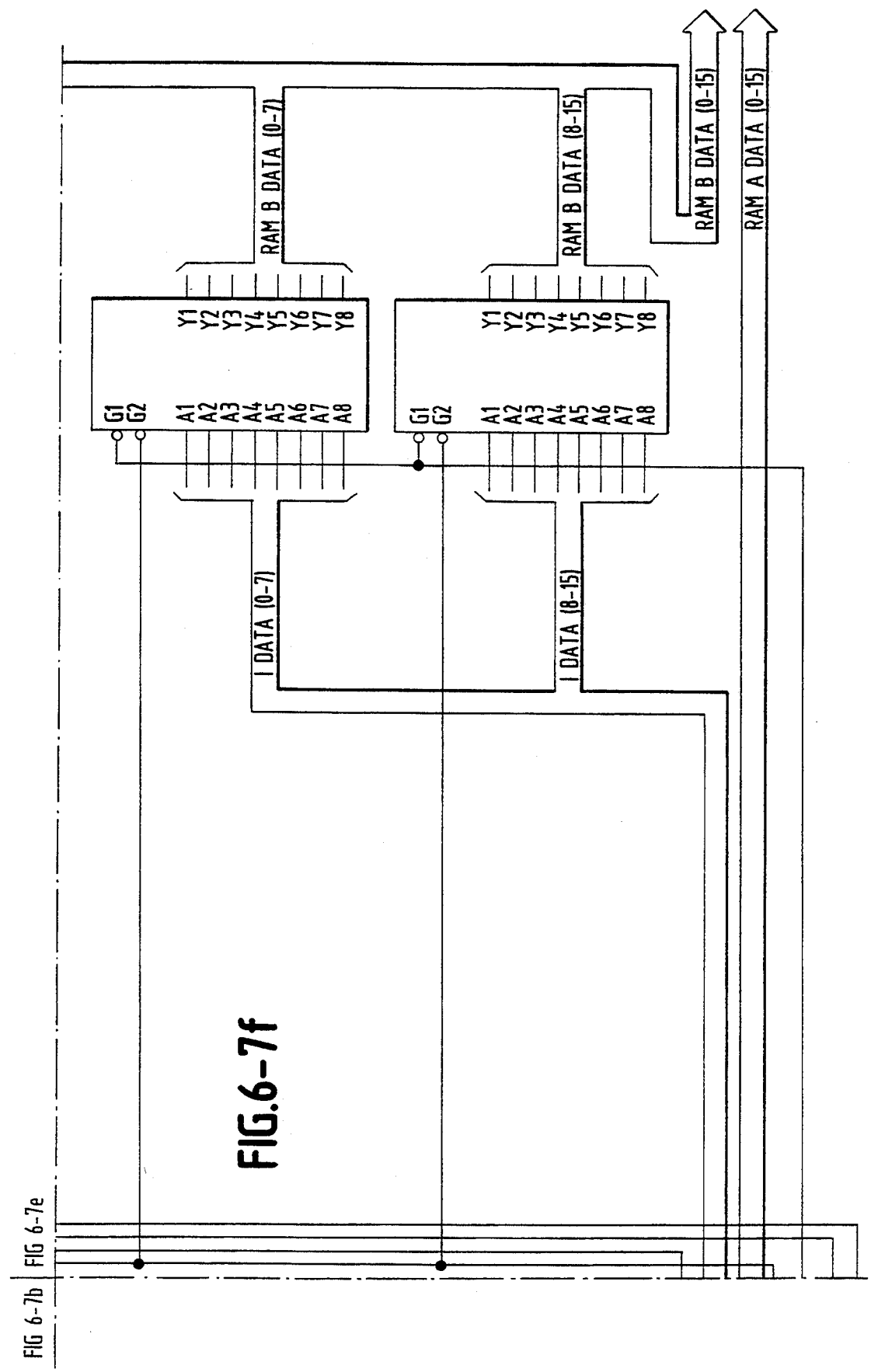

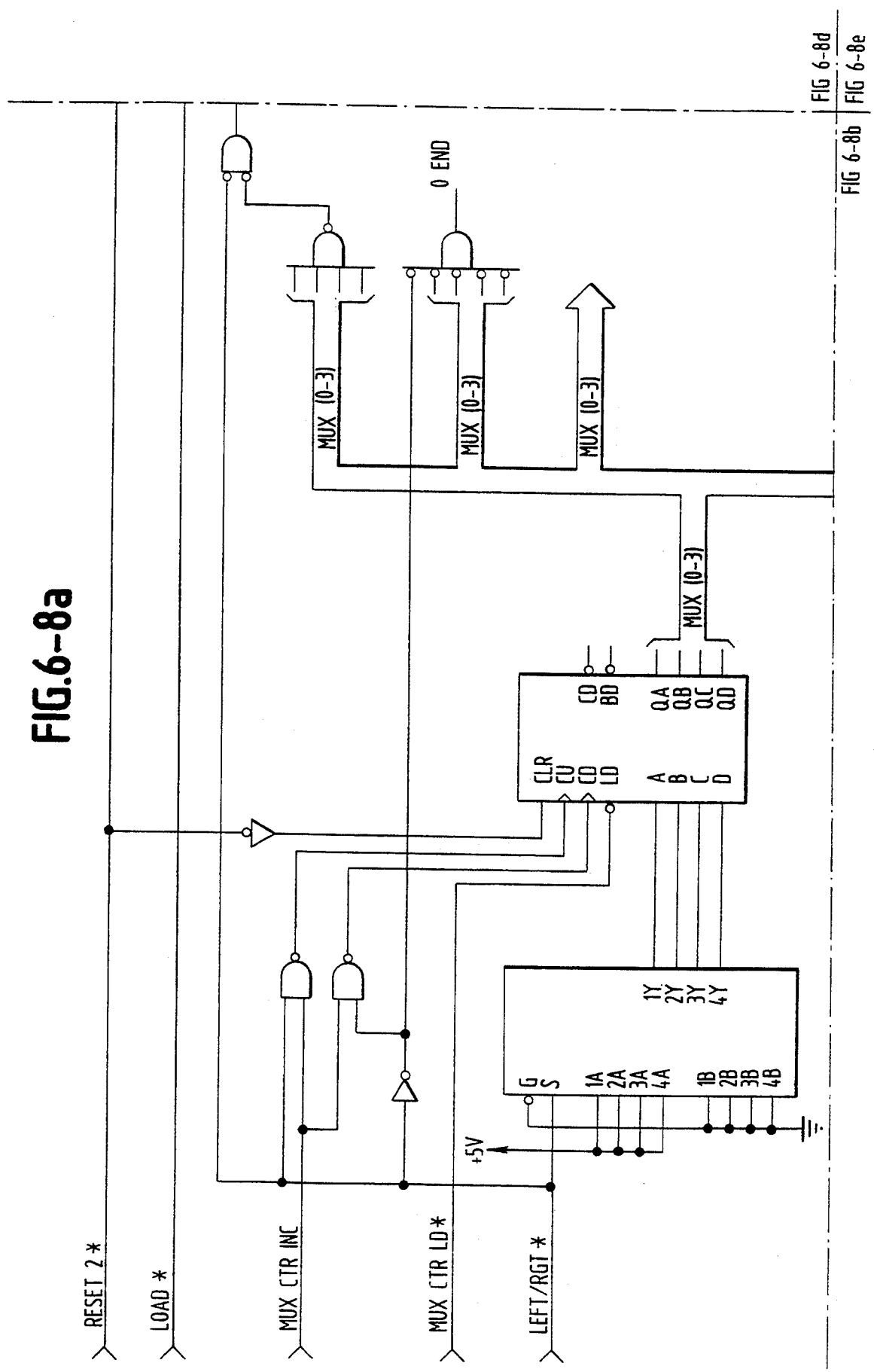

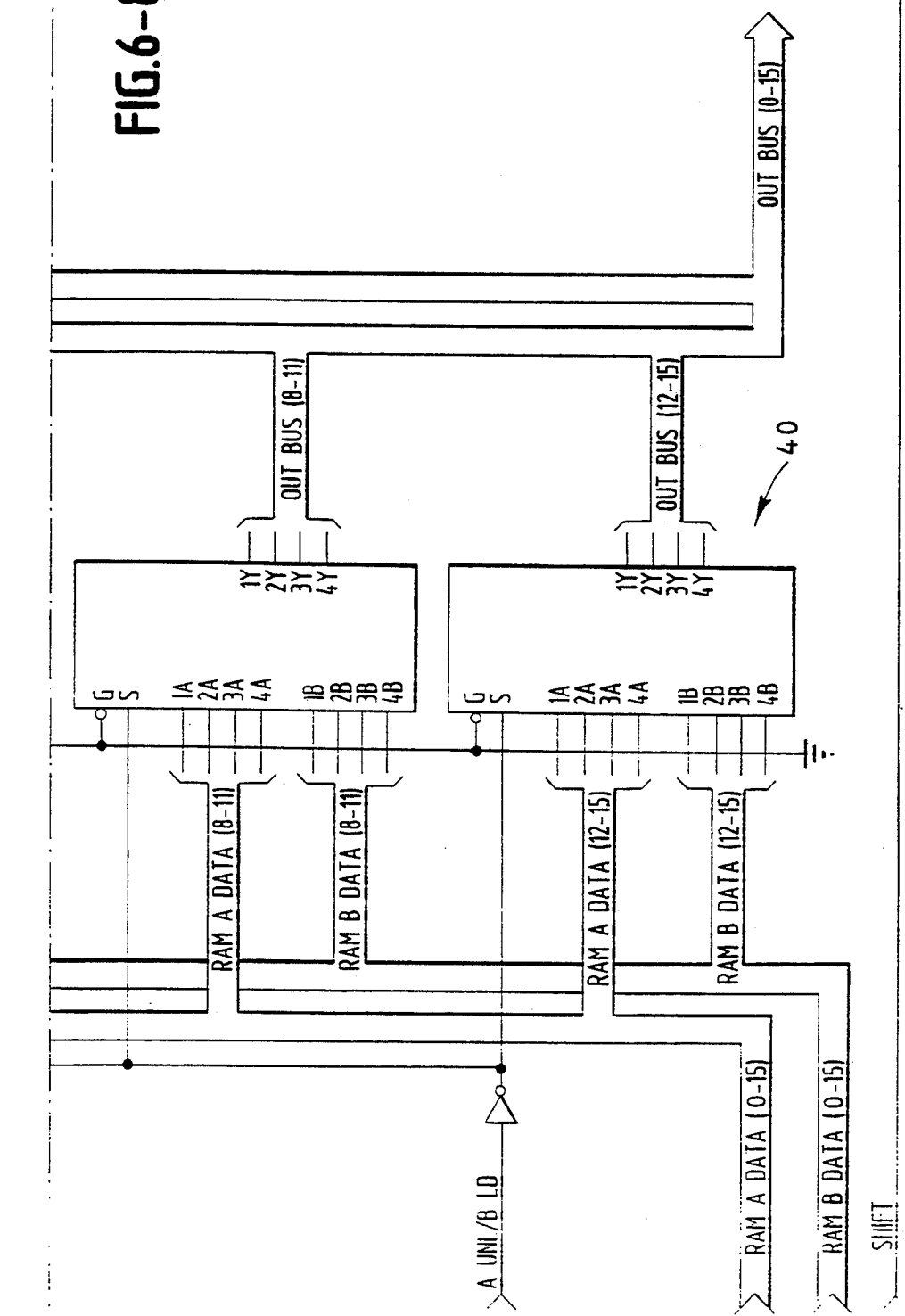

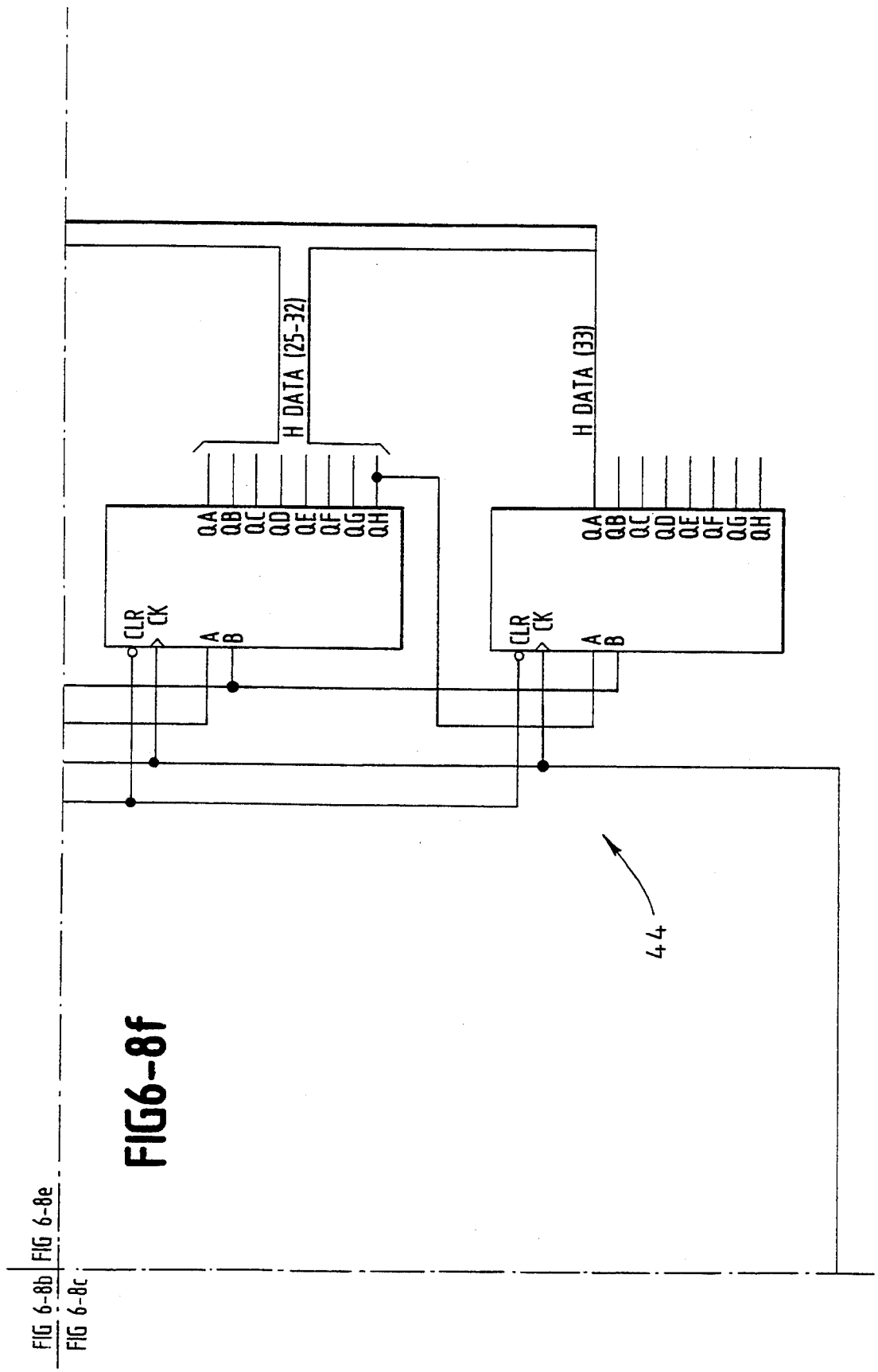

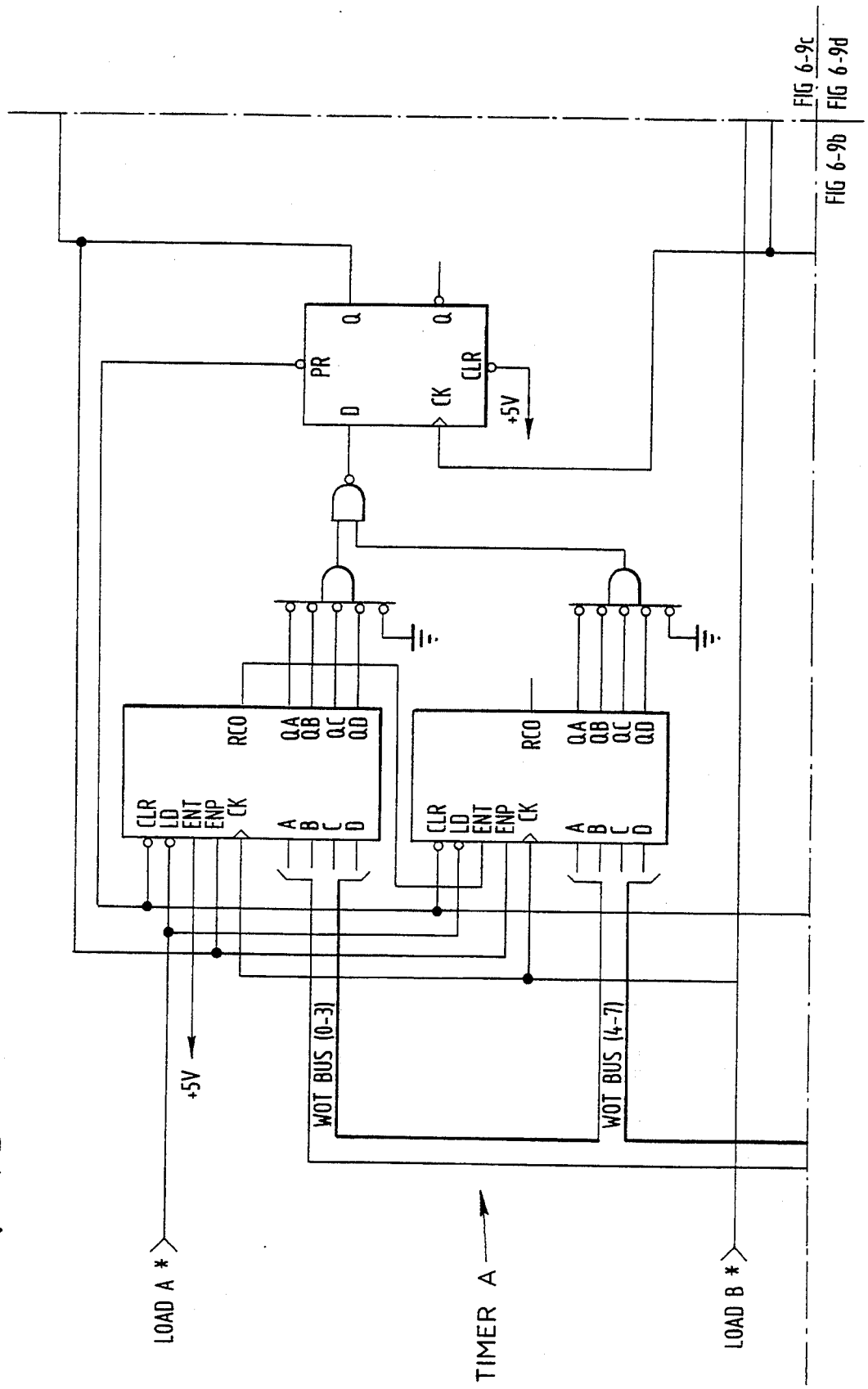

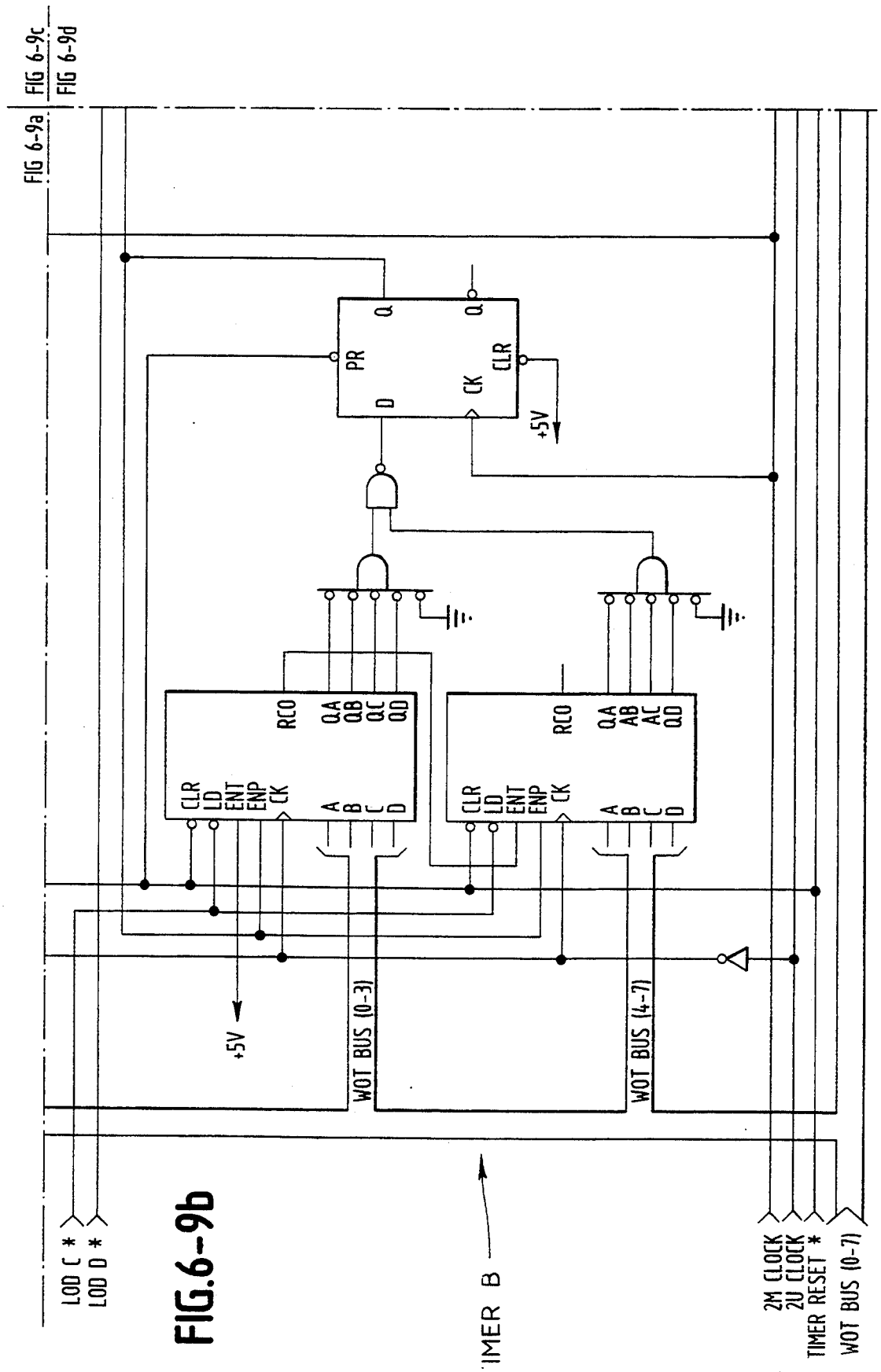

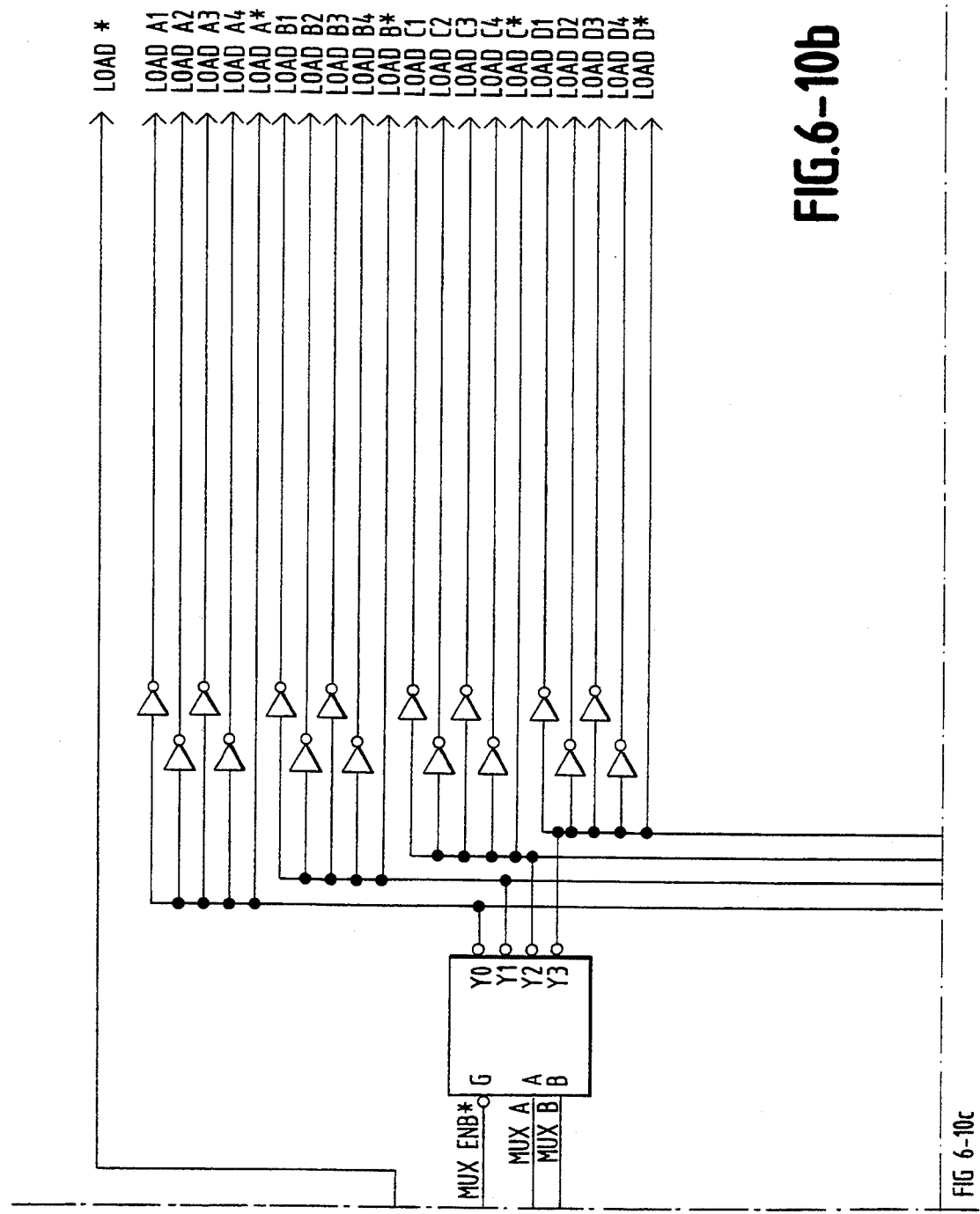

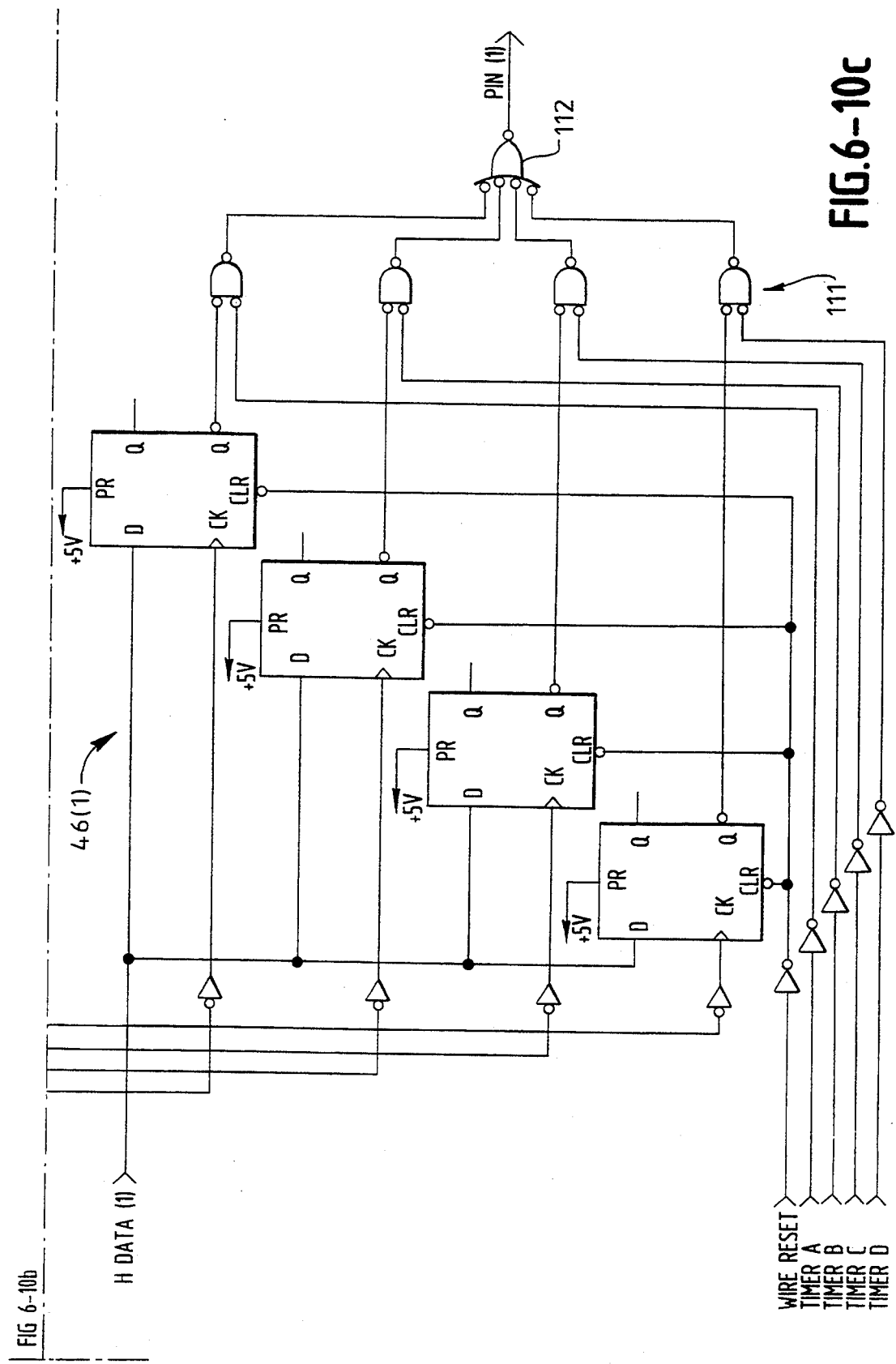

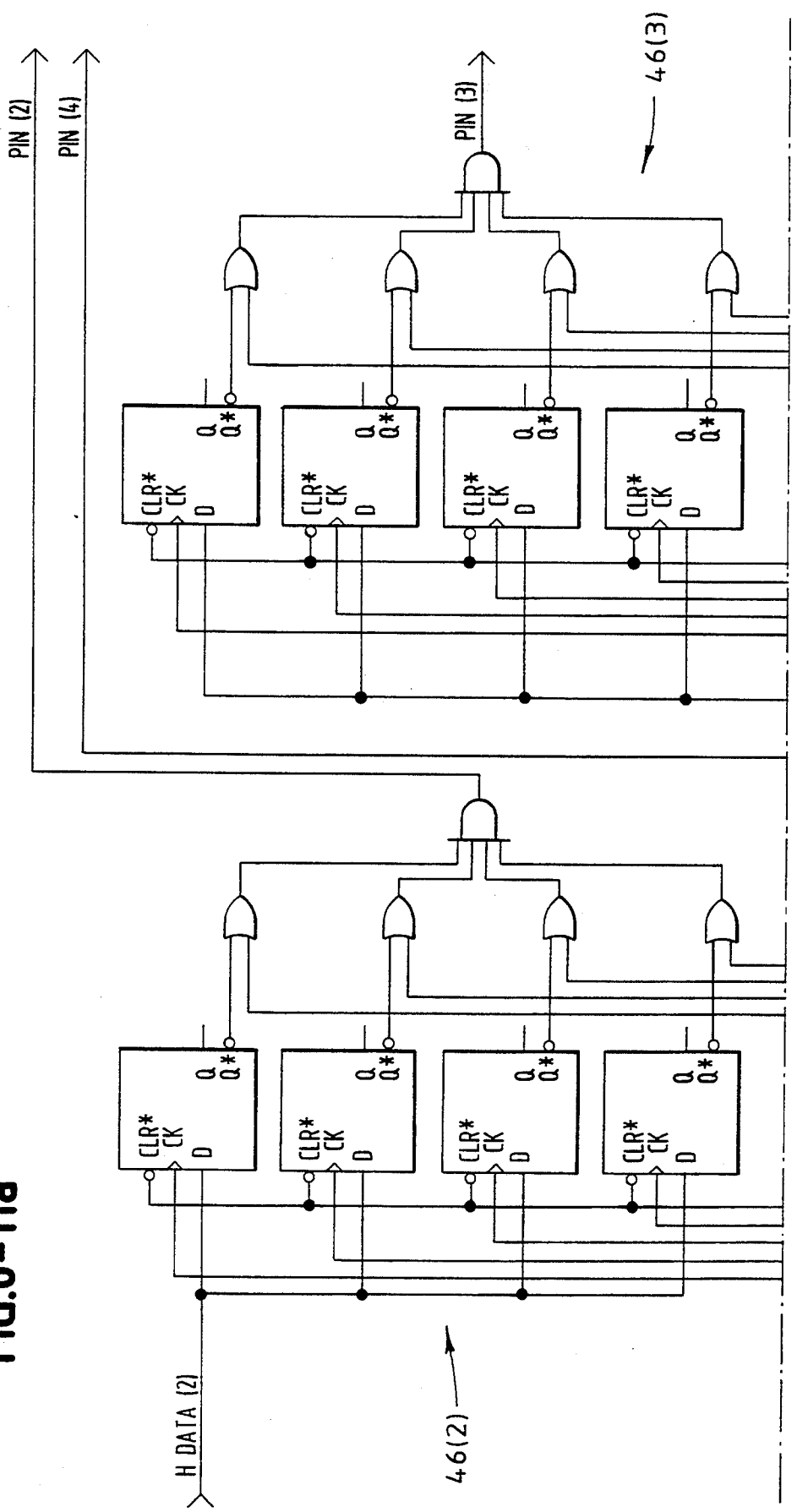

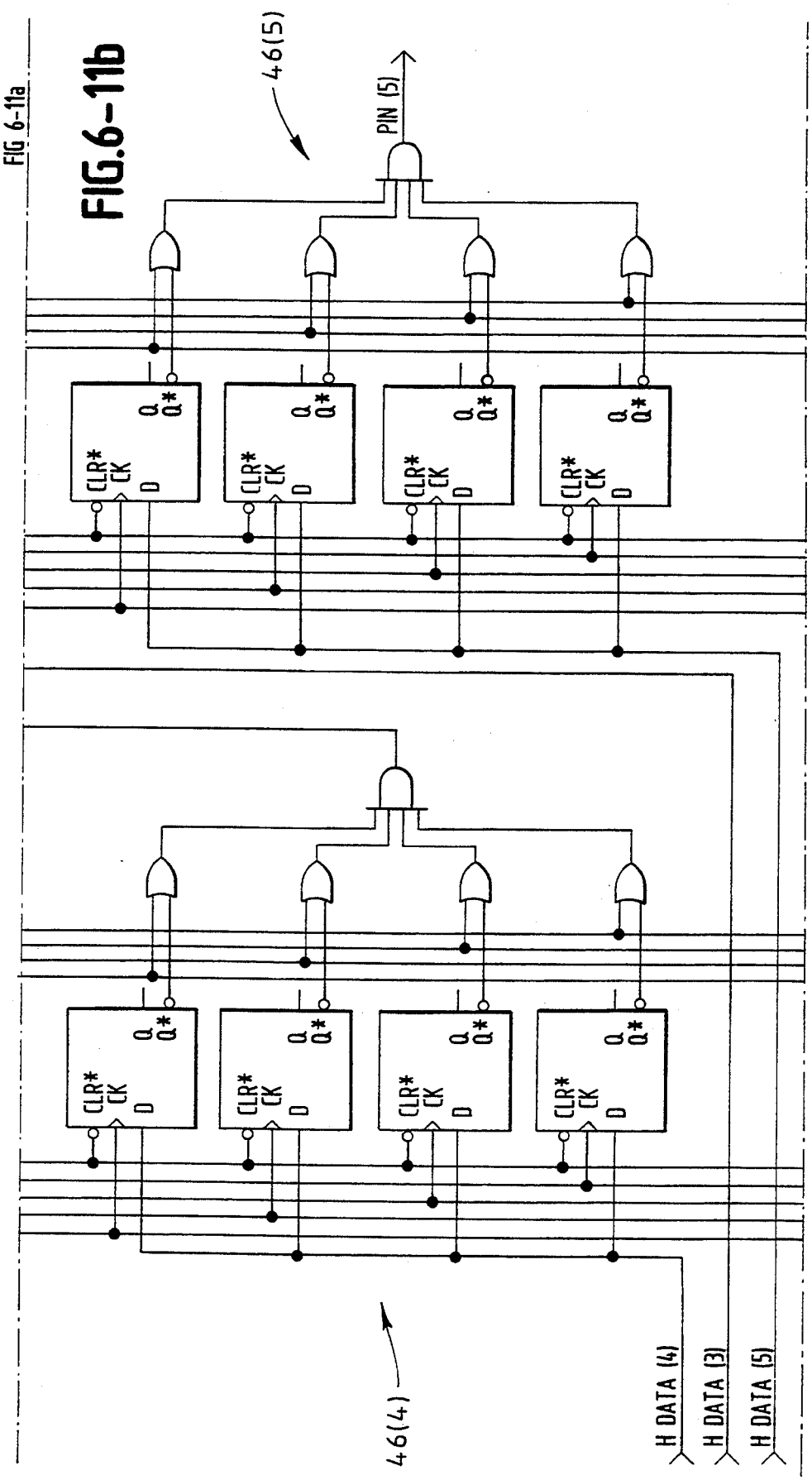

PRINTER HAVING A MULTIPLE SCAN LINE PRINTHEAD CONTROLLER

BACKGROUND OF THE INVENTION

1. Field of the Invention

The present invention relates to printers, and more particularly, to printers having a multiple print element printhead.

2. Background of the Invention

Many printers have a printhead which is placed in physical proximity to the printing medium (such as paper) on which an image is to be imprinted. The printhead typically has one or more print elements such as print wires or ink jets, each of which can imprint a dot or other picture element (pixel) on the print medium. The printhead is usually scanned back and forth across the print medium in a raster motion until the entire image has been printed.

To reduce the required number of scans, printheads may have as many as 33 print elements vertically aligned on the printhead. Selected ones of the print elements are actuated in accordance with data provided to the printhead by the printer as the printhead is scanned across the printing medium. The format of the data provided to the printhead is necessarily a function of the number and arrangement of the print elements of the printhead. However, different models of printers from different manufacturers and even from the same manufacturer often have different types of printheads. As a consequence, customized circuitry has often be required for each different printhead to provide the pixel data format required by the particular printhead type.

SUMMARY OF THE INVENTION

It is an object of the present invention to provide an improved printer obviating, for practical purposes, the above mentioned limitations, particularly, in a manner requiring a relatively uncomplicated electronic arrangement.

These and other objects and advantages are achieved in a printer which in accordance with the illustrated embodiment, generates a bit mapped raster matrix of an image to be printed, and accesses from the matrix, a group of bits corresponding in number to the number of printing elements of the printhead. This group of bits is used to drive the printing elements of the printhead so as to print the image. In printers having raster scanning printheads, the selected groups of bits are accessed from the bit mapped raster matrix synchronously with the raster scanning of the printhead.

For example, the printhead of the printer of the illustrated embodiment is a raster scanning printhead having 33 printing elements displaced vertically in a single vertical column. Thus, the printhead is capable of printing 33 adjacent scan lines during each pass of the raster scan of the printhead. To prepare print data in a format acceptable to the print engine of the printer, the printer converts the image to be printed into a two-dimensional raster matrix of pixels. In the illustrated embodiment, each print element of the printhead is a print wire or pin which, when actuated, imprints a dot on the printing medium which is typically paper. Each pixel of the raster matrix of pixels corresponds to a dot to be imprinted or not imprinted on the printing medium depending upon the value of the pixel data.

Scanning from left to right and starting at the top of the image to be printed, the printer accesses the first group of 33 pixels in each column of pixels in the matrix, one column at a time, and applies the bit data for those 33 pixels to the print engine in time for the print wires of the printhead to be actuated in accordance with the 33 bits of the pixel data. As the printhead continues to scan, the printer accesses the first group of 33 pixels of the next column of the raster matrix of pixels and supplies that pixel data to the print engine. This process is continued until the printhead reaches the end of the scan line. At this point 33 rows of pixel data, referred to herein as a "segment," have been processed.

In the illustrated embodiment, the printhead alternates between left to right and right to left motions as each scan line is completed. Thus, after the first scan line has been scanned, the printing medium is advanced to move the next scan line into position for the printhead which then initiates scanning in a right to left motion. Consequently, the printer accesses the second group of 33 pixels in the last column of the raster matrix of the pixels as the printhead initiates the right to left scan. The second group of 33 pixels is sequentially accessed from each succeeding column until the first column of the raster matrix is again reached. This process is repeated for each subsequent segment of the raster matrix until the entire image has been printed.

It should be appreciated that the above architecture is readily adaptable to many different types of printheads having a variety of print element arrangements. Thus, if the printhead has 22 print elements rather than 33 print elements, the procedure is readily modified so as to sequentially access groups of 22 pixels rather than 33 as each scan line segment is processed. Additional advantages will be apparent from the following more detailed description.

BRIEF DESCRIPTION OF THE DRAWINGS

FIGS. 6-1 to 6-11 are more detailed schematic diagrams of the raster printhead controller of FIG. 4.

DETAILED DESCRIPTION OF THE DRAWINGS

Figure 1:
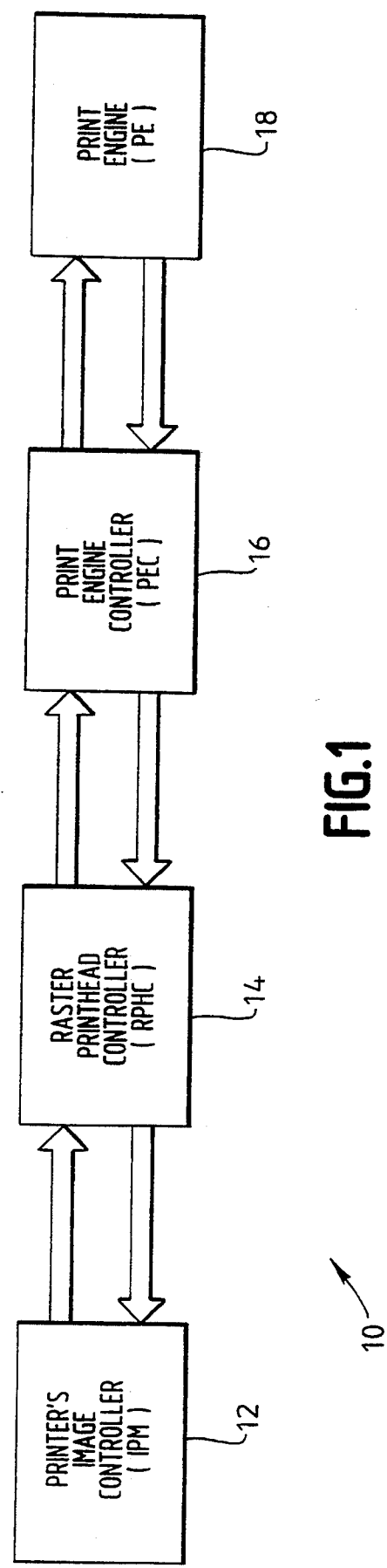
FIG. 1 is a schematic block diagram of a printer in accordance with a preferred embodiment of present invention.
Figure 2:
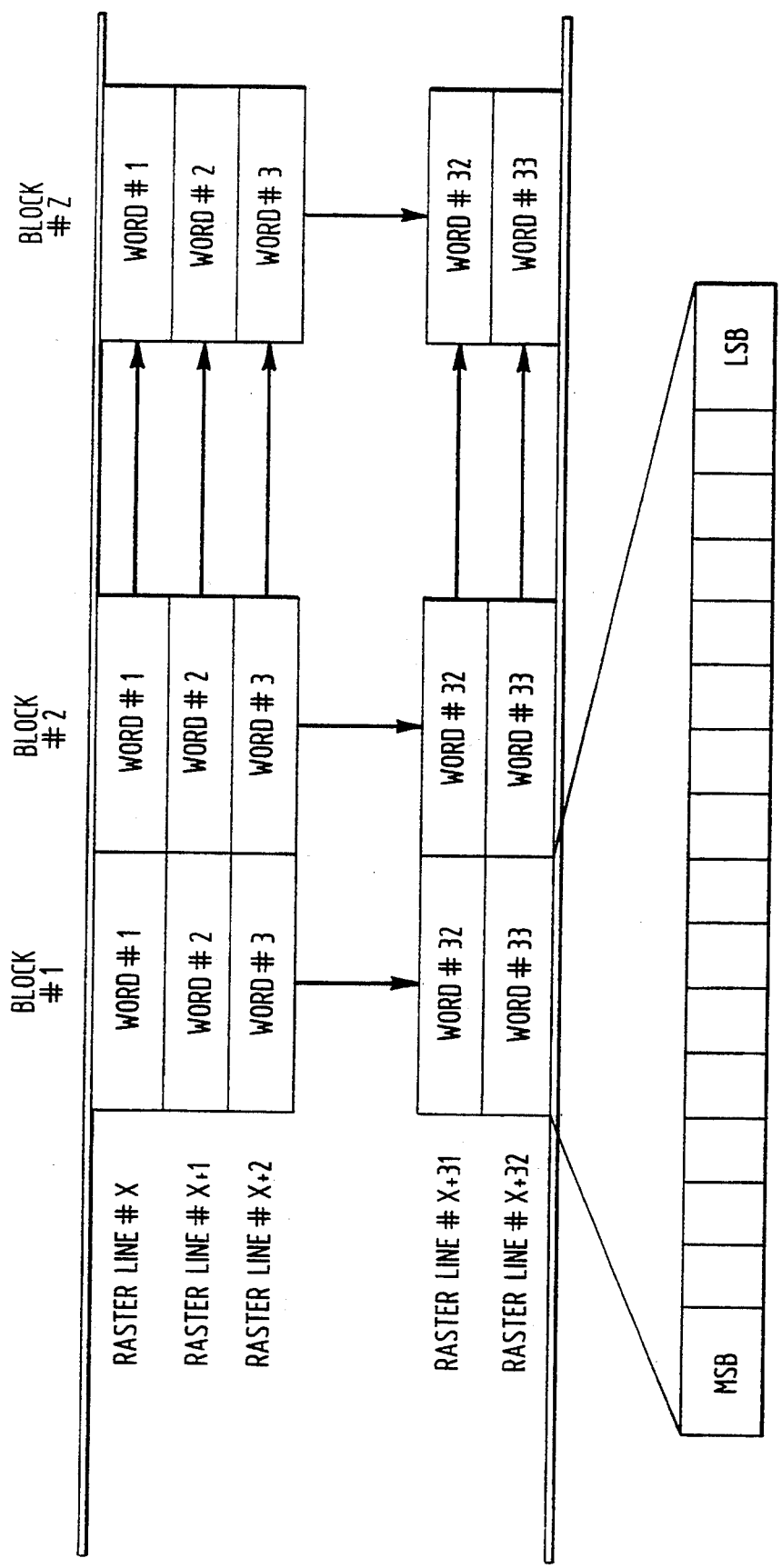
FIG. 2 is a schematic diagram of a segment of a bit mapped raster matrix of an image to printed.

FIG. 1 shows a schematic diagram of a printer in accordance with a preferred embodiment of the present invention. The printer indicated generally at 10 includes a printer's image controller (IPM) 12 which generates a bit mapped raster matrix of an image to be printed. A segment of a typical bit mapped raster matrix is depicted in FIG. 2. A raster printhead controller (RPHC) 14 (FIG. 1) provides an interface between the printer's image controller 12 and a print engine controller (PEC) 16 of the printer 10. The raster printhead controller 14 accepts words of horizontal raster data from the printer's image controller 12 and converts the horizontal raster data into vertical patterns of data in a format suitable for the print engine controller 16.

Figure 3:
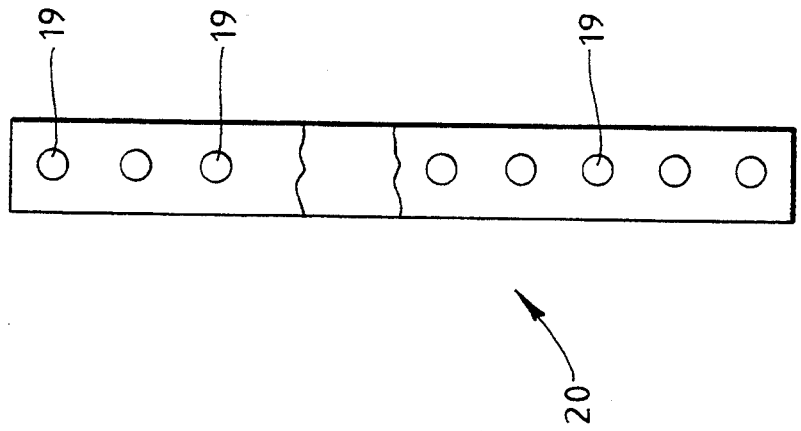
FIG. 3 is a schematic diagram of a print wire printhead.

In the illustrated embodiment, the print engine 18 which is controlled by the print engine controller 16 includes a 33 wire printhead 20 which is schematically represented in FIG. 3. The 33 print wires or pins 19 of the printhead 20 are arranged in a single vertical column and can be grouped in a variety of ways. For example, the wires 19 can be grouped in three groups so that the printhead can print three lines of characters simultaneously during each scan of the printhead 20. Alternatively, all wires can be used together to print graphics. As explained in greater detail below, the raster printhead controller 14 when converting the horizontal raster data from the printer's image controller 12, converts the pixel data into vertical groups of 33 bits, each bit corresponding to one of the 33 print wires of printhead 20.

Referring now to FIG. 2, a segment of the bit mapped raster matrix generated by the printer's image controller 12 is shown. The segment of FIG. 2 contains the pixel data for one printhead scan line of the printhead 20. Thus, the matrix segment has 33 rows of pixel word data, each row corresponding to the raster scan line of one print wire of the printhead 20. In the illustrated embodiment, each pixel data word has 16 bits wherein each bit represents a pixel or "dot" of the image to be printed. The data is in raster form such that bits representing the pixels are arranged horizontally and the most significant bit (MSB) of each word corresponds to the left most "dot" of the image portion represented by the pixel word. Although each pixel or dot is represented by a single bit in the illustrated embodiment, it is anticipated that a plurality of bits could be associated with each pixel to represent, for example, the intensity, color or both of the associated pixel.

Figure 4:
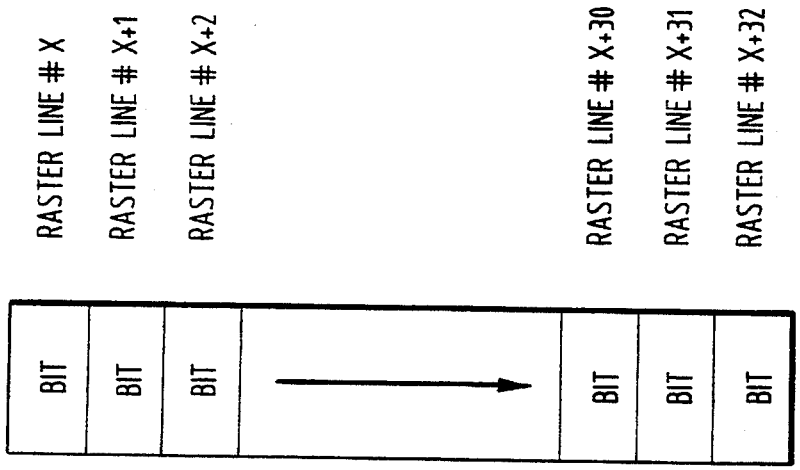
FIG. 4 is a schematic diagram of a vertical group of pixel data bits.

The raster printhead controller 14 accepts a vertical block of 33 pixel data words from the printer's image controller 12 and sequentially converts it to 16 groups of 33 vertical pixel bits. One such vertical group of 33 pixel bits is shown in FIG. 4. As previously mentioned, each bit of the vertical group corresponds to one print wire of the printhead 20. In a left to right scan of the printhead, block #1 (FIG. 2) is the first block of 33 pixel words of the matrix segment sent by the printer's image controller 12 to the raster printhead controller 14. Since the data is in raster form, the first pixel data word sent of the 33 words of the block is the topmost word of the block (pixel word #1), the second word sent is the second word (word #2) of pixel word data from the top, etc. The remaining blocks of the segment are then sequentially sent to the raster printhead controller 14 for conversion to vertical groups of pixel bits until all the blocks of the printhead scan line have been sent. In a right-to-left scan of the printhead, the first block to be transmitted is block #Z, and the second block is the block to the immediate left, that is, block #Z-1, etc.

Figure 5:
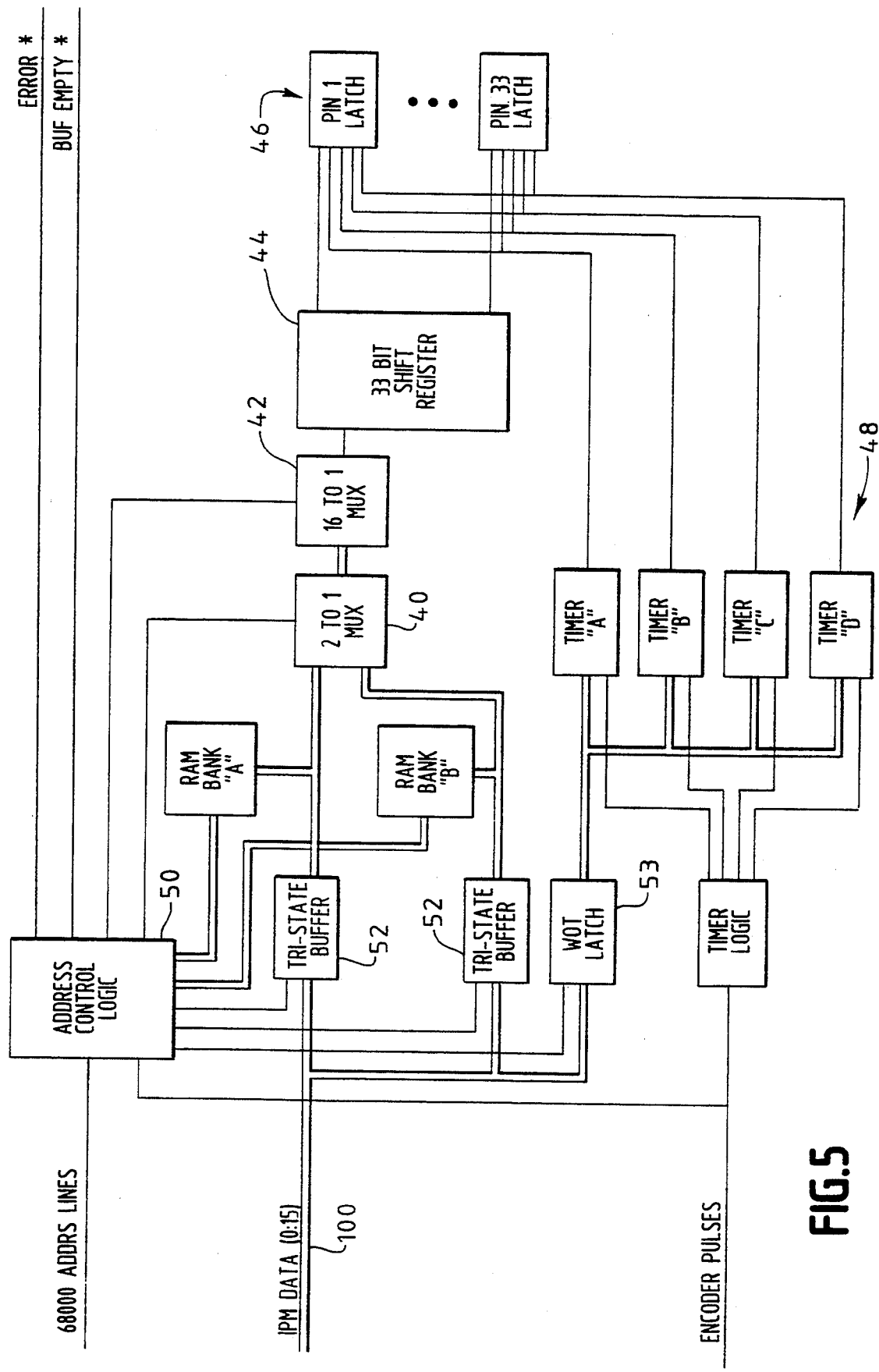
FIG. 5 is a schematic block diagram of the raster printhead controller of FIG. 1.

Referring now to FIG. 5, a more detailed schematic diagram of the raster printhead controller 14 is shown. The raster printhead controller 14 has two banks of random access memory for storing blocks of pixel data words from the printer's image controller 12, RAM bank A and RAM bank B. A two-to-one multiplexer 40 selects one of the RAM banks to unload pixel data words for conversion to vertical groups of 33 pixel data bits, while the other RAM bank is being loaded with a new block of pixel data words from the printer's image controller 12.

The pixel data words are transferred one at a time from the selected RAM bank to a sixteen-to-one multiplexer 42 which selects one pixel data bit from the pixel data word and transfers the selected pixel data bit to a 33 bit shift register 44. In a left-to-right scan, the most significant bit is the first bit selected for transfer to the shift register 44. After the next pixel data word of the block of pixel data words is loaded from the selected RAM bank, the sixteen-to-one multiplexer 42 again selects the same bit position, in this example, the most significant bit, for transfer to the shift register 44. However, before loading the new bit, the shift register 44 first shifts the data stored therein one bit position to make room for the new bit. Consequently, after the entire block of pixel data words has been unloaded from the selected RAM bank, the shift register 44 contains 33 bits of pixel data, one pixel bit from each pixel data word. Since each pixel data bit is selected from the same bit position of the pixel data words, the 33 pixel data bits stored in the shift register 44 constitute a vertical "slice" or group of pixel data bits (see FIG. 4) of the bit mapped raster matrix of pixel data depicted in FIG. 2. After all 33 bits of the vertical group of 33 bits have been loaded into the shift register 44, each pixel data bit is latched onto one of 33 pin latches 46, each pin latch corresponding to one of the 33 print wires of the printhead 20. The output of the latches 46 are logically combined with the output of a timer circuit 48 to drive the print wire drivers of the print engine controller 16 (FIG. 1). This process is continued until all 16 columns or vertical groups of pixel data from the block of pixel data words have been printed by the print engine 18.

By the time that the 16 columns of vertical pixel data bits has been output, the printer's image controller 12 will have loaded the next block of pixel data words into the other RAM bank. After the last column of vertical pixel data bits is latched and forwarded to the print engine controller, and the other RAM bank has been loaded, the two-to-one multiplexer 40 switches to the RAM bank just loaded. After the pixel data word is converted to sixteen sequential columns of vertical pixel data bits, the RAM banks switch again to continue the printing process.

The raster printhead controller 14 has an address control logic 50 by which the printer's image controller 12 can access various locations in the raster printhead controller to selectively read or write data. Buffers 52 are provided for data transfer functions.

The raster printhead controller 14 is shown in still greater detail in FIGS. 6-1 through 6-11. FIGS. 6-1 to 6-11 depict schematic diagrams of various integrated circuits. The raster printhead controller of the illustrated embodiment is fabricated as an ASIC packaged in an 84 lead JEDEC standard plastic leaded chip carrier package on 50 mil centers. The device 14 has the following input and output signals as set forth in Table 1 below:

TABLE 1

| Signal | Source/Dest. | Description |
| --- | --- | --- |
| WIRE(1) TO WIRE(33) | To the PEC | 33 data lines that carry data from the device to the Print Head Wire Drivers |
| RPHC_RDY | To the PEC | When this signal is active, it signifies that the RPHC is enabled and that the first block of data has been loaded from |

TABLE 1-continued

| Signal | Source/Dest. | Description |
|---|---|---|
| SYSTEM_CLK | From the PEC | the IPM<br>This clock input signal is a single phase TTL-compatible signal used to synchronize internal control signals. This input should be a constant frequency square wave |
| PEC_D_REQ | From the PEC | This signal starts the process of building the printhead data from the raster data received from the controller |
| ENABLE | From the PEC | When this active high input is disabled, no firing pulses are generated but all other functions are unaffected |
| DIRECTION | From the PEC | This input is used by the RPHC to determine the direction on motion of the carriage. When the signal is high the carriage is moving to the right and when the signal is low, the carriage is moving to the left |
| WIRE_H/L* | From the PEC | This input controls the output polarity of Wire(1) to Wire(33). A high input will force the output signals to be active high and a low input will force active low signals. This signal should be tied directly to Vcc or ground, putting the wrong voltage level on this pin can cause damage to the printhead |
| IPM_DATA(0) TO IPM_DATA(15) | To/From the IPM | Three state driven bidirectional data lines used to transfer data, commands and status between the processor and the device. IPM_Data(0) is the least significant bit |
| DTACK* | To the IPM | An output that signals the completion of the phase of a bus cycle to the processor. The falling edge of the signal indicates that valid data is available on the data bus during a processor read cycle, or that data has been read from the data bus during a processor write cycle. This signal is open collector |
| E_DTACK* | To the IPM | Same as DTACK* except it is issued ½ clock cycle earlier |
| ERROR* | To the IPM | Signifies that the RPHC has detected an error internally |
| BUF_EMPTY* | To the IPM | This output signifies that one of the two RAM banks is ready to accept 33 words of data. When the first data word is received this signal goes inactive |
| IPM_RESET* | From the IPM | This active low input will initialize the device during power up or in response to a total system reset |
| RPHC_CS* | From the IPM | This active low input activates the device for internal register access or data loading |
| L_RD/WT* | From the IPM | An input signal that controls the direction of data flow on the data bus, high read, low write. Only word access is allowed to and from this device |
| L_LDS* | From the IPM | Lower data strobe, an input signal along with RPHC_CS*, L_UDS* and L_RD/WT* control the flow of data on the data bus |
| L_UDS* | From the IPM | Upper data strobe, an input signal along with RPHC_CS*, L_LDS* and L_RD/WT* control the flow of data on the data bus |
| L_ADRS(1) to L_ADRS(3) | From the IPM | These address lines are used to address the device's internal registers. |

Figures 1, 6:
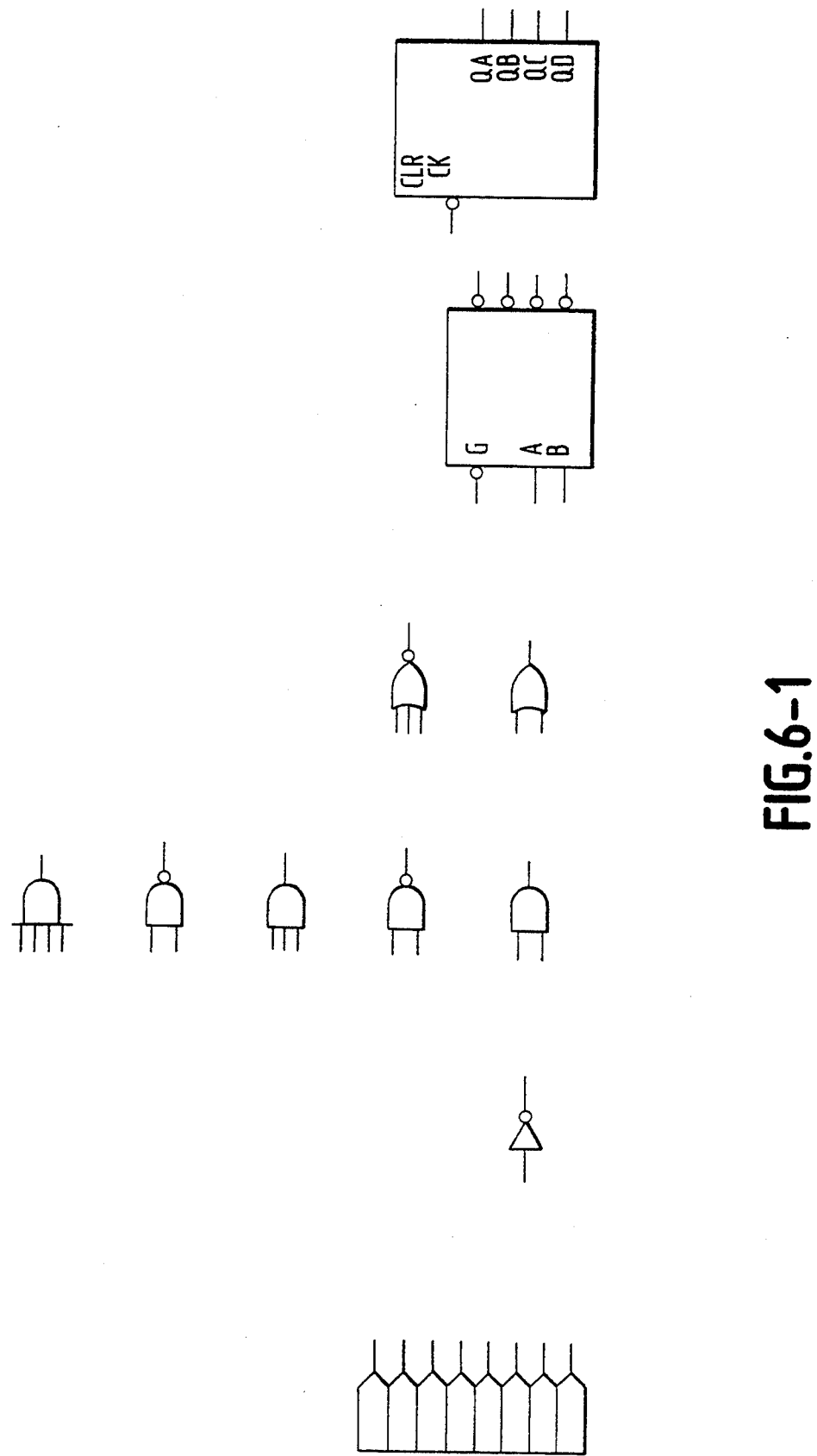
Figures 2, 6:
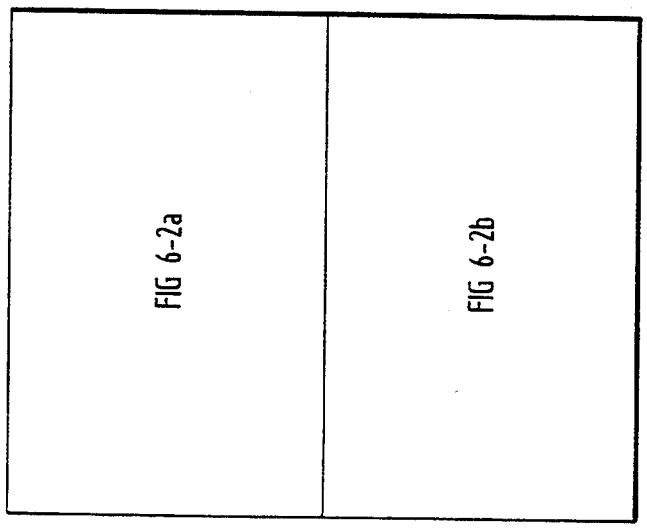
Figures 2A, 6:
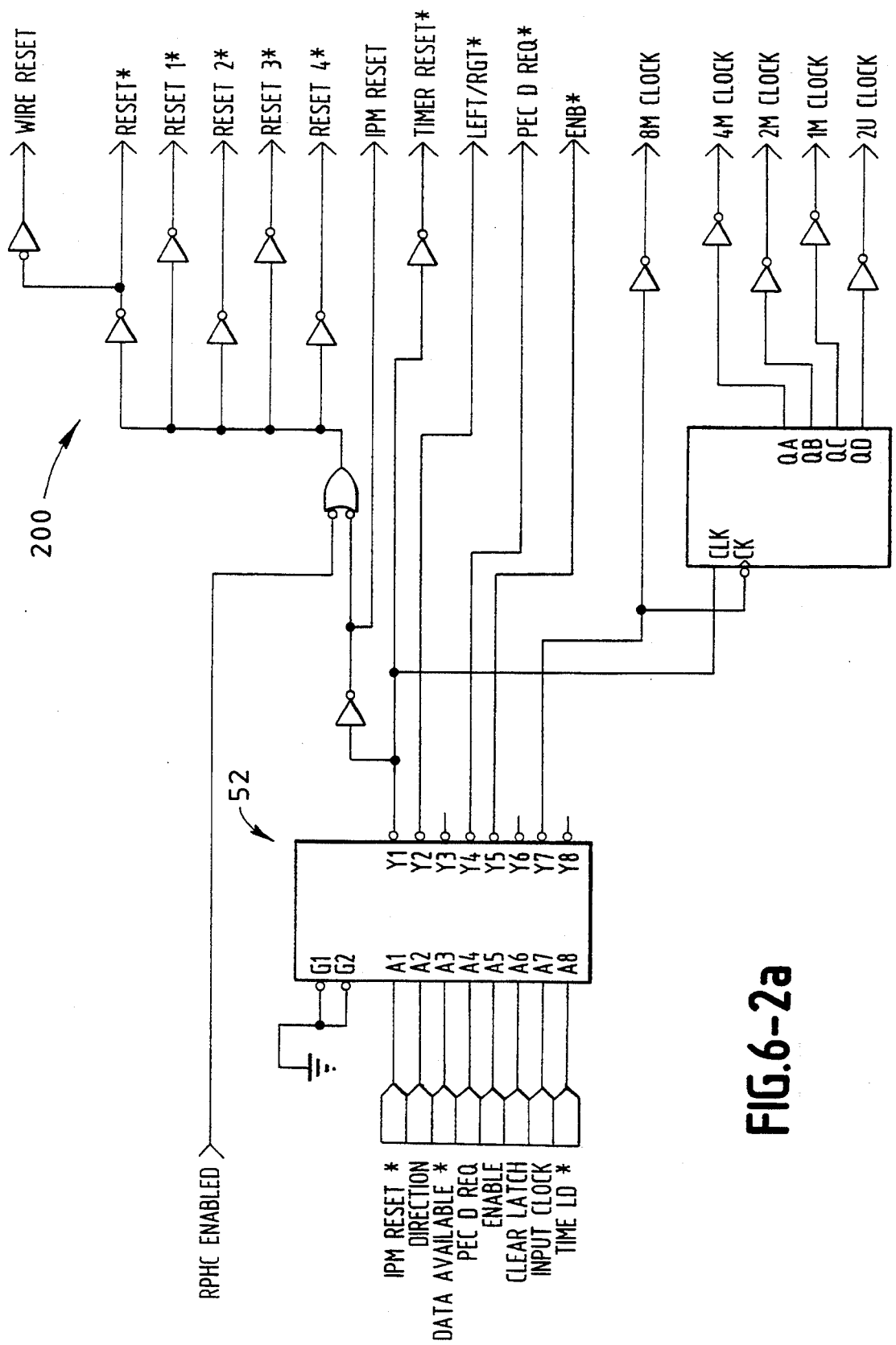
Figures 2B, 6:
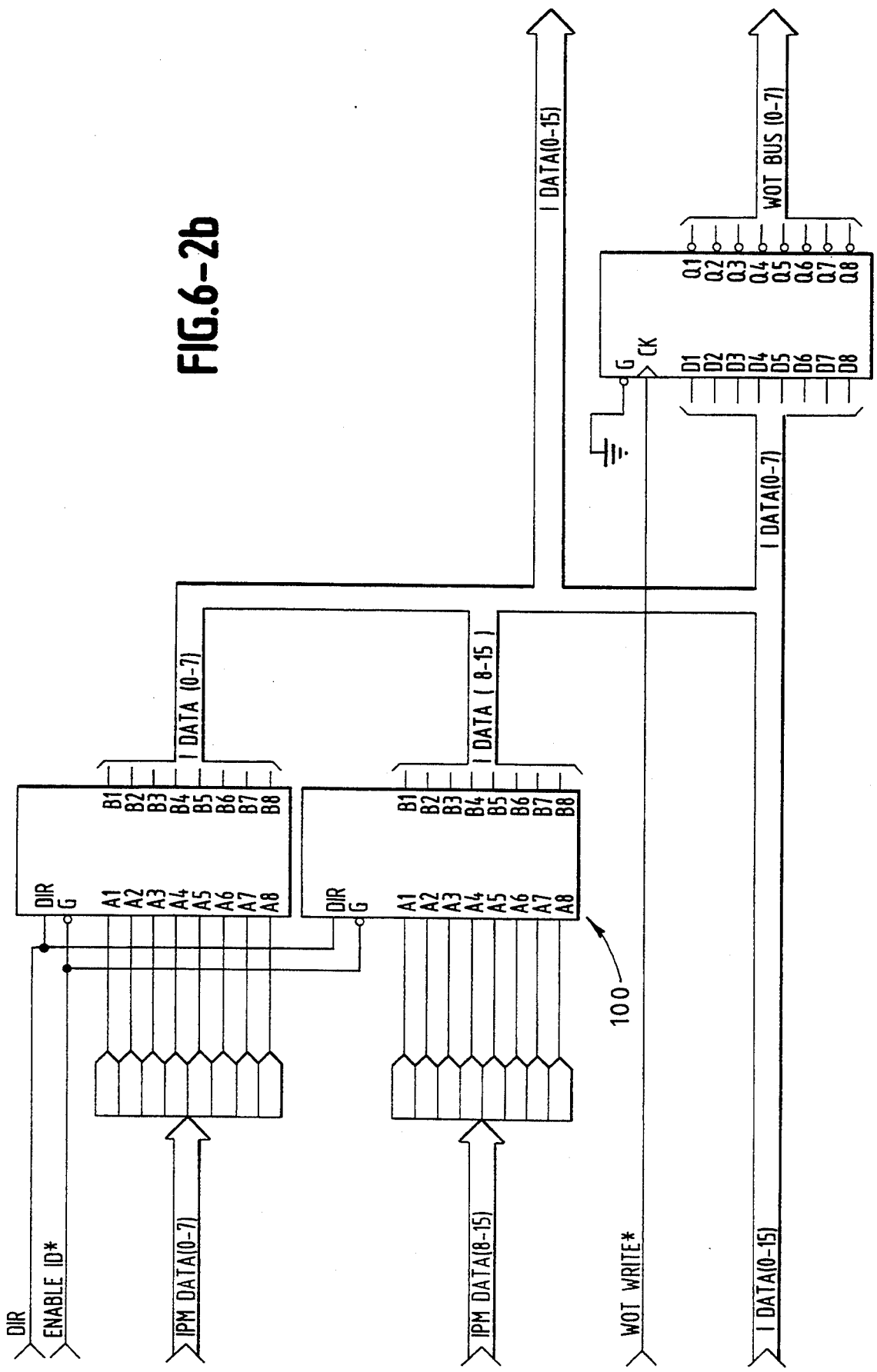
Figures 3, 6:
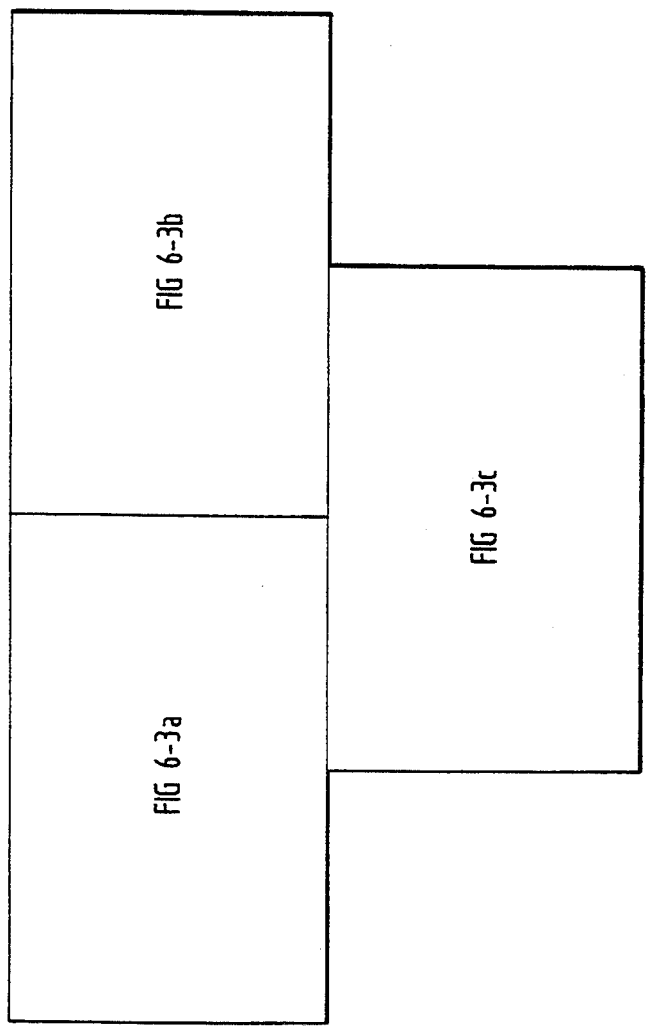
Figures 3B, 6:
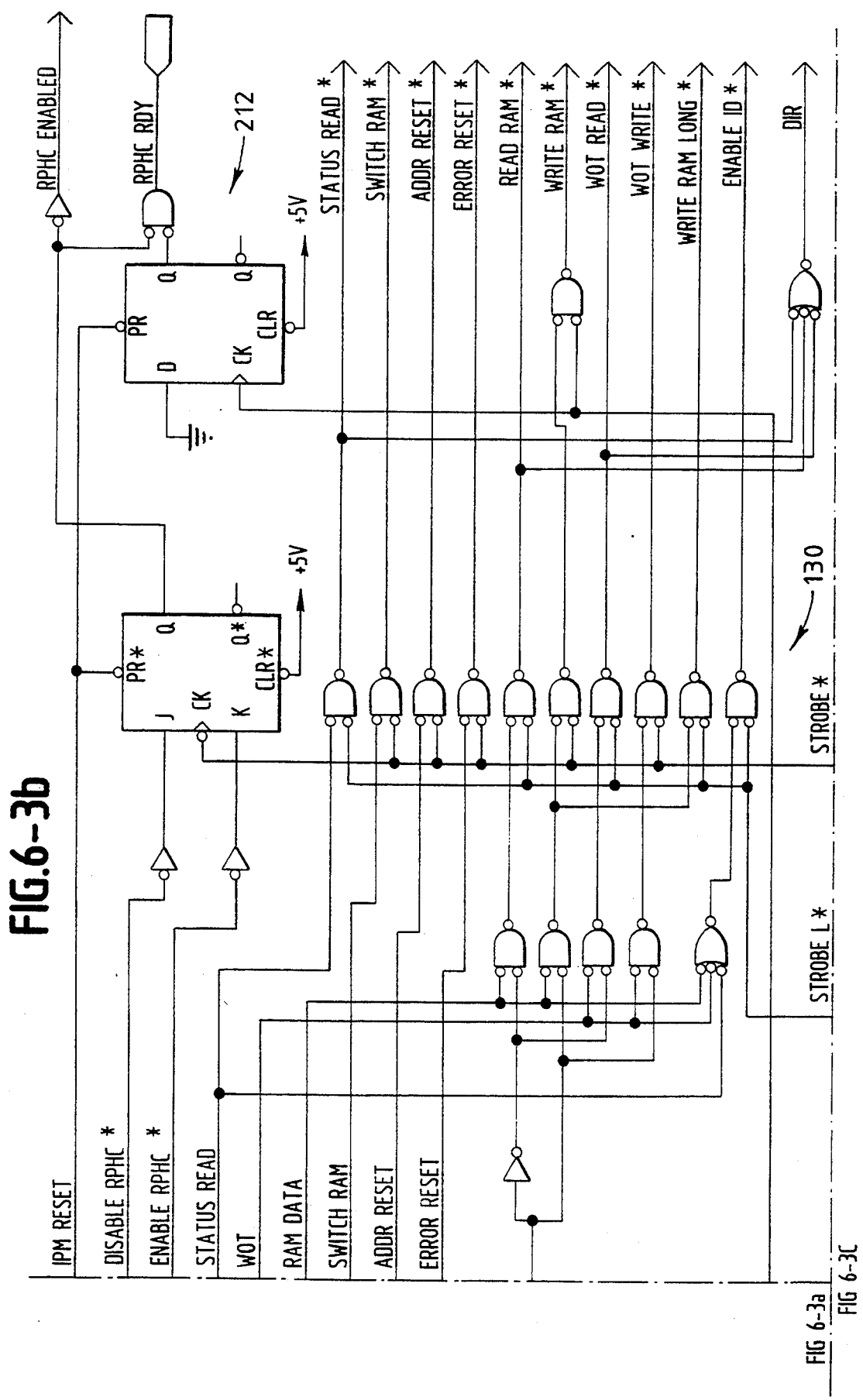
Figures 3C, 6:
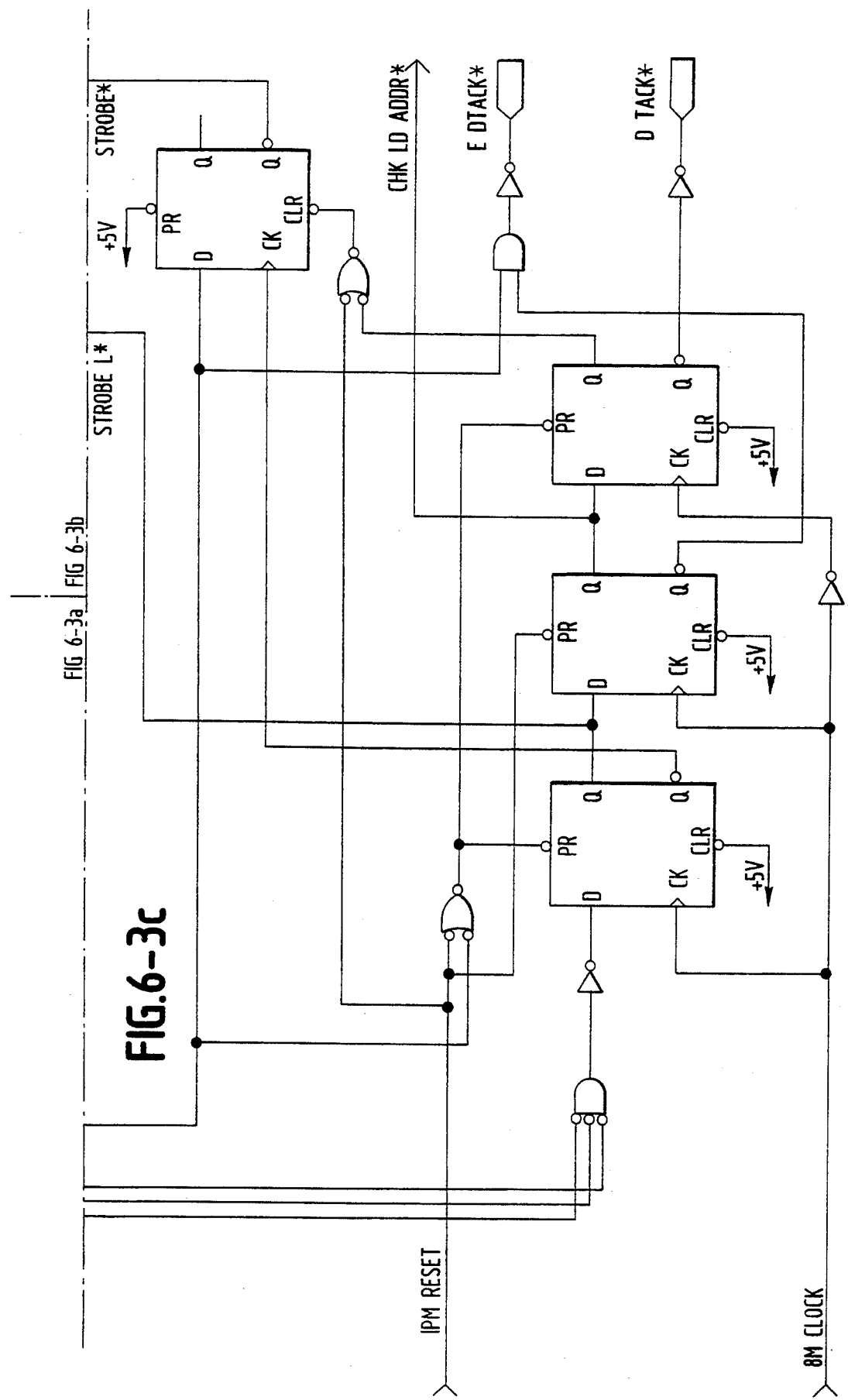
Figures 4B, 6:
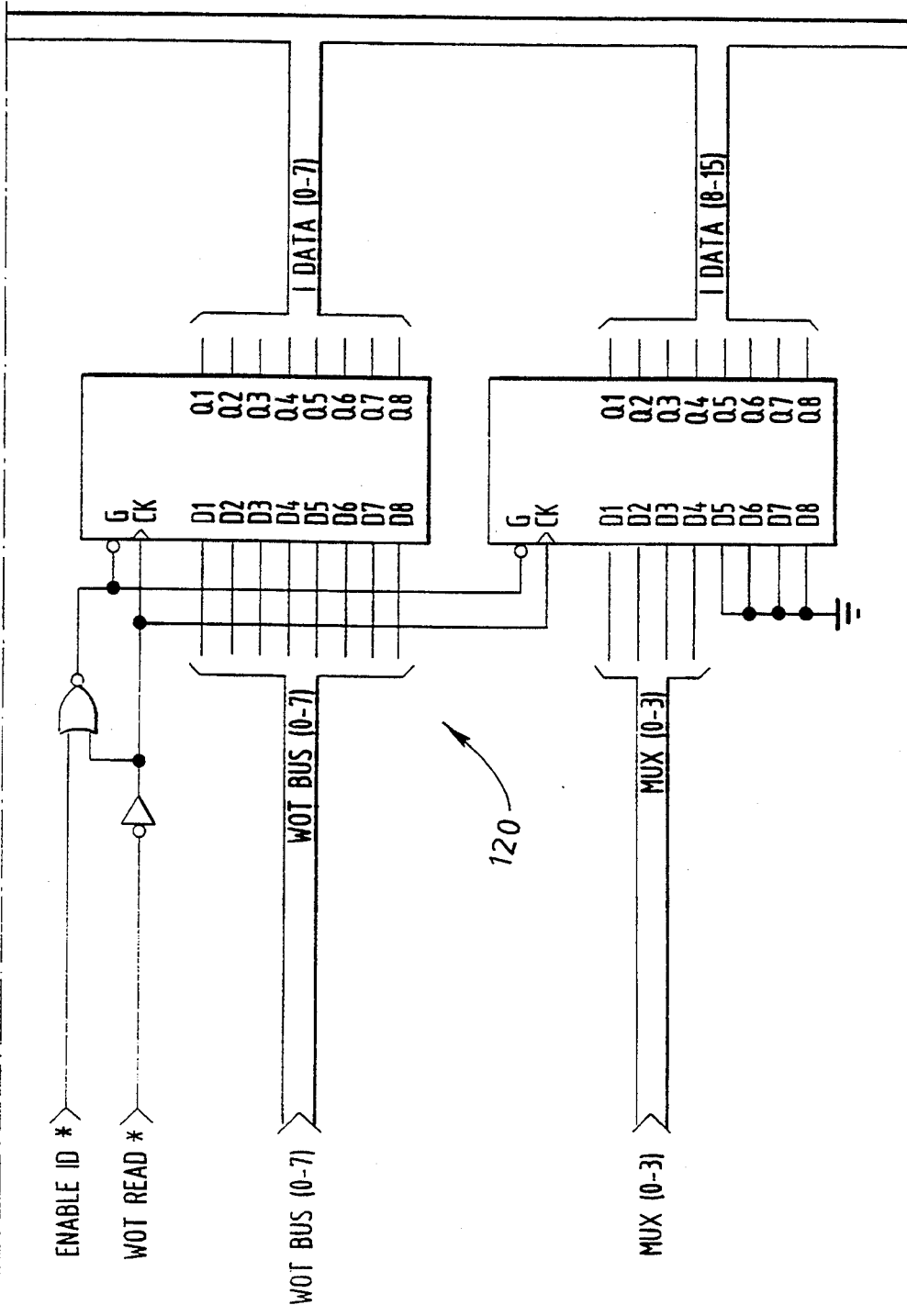
Figures 5, 6:
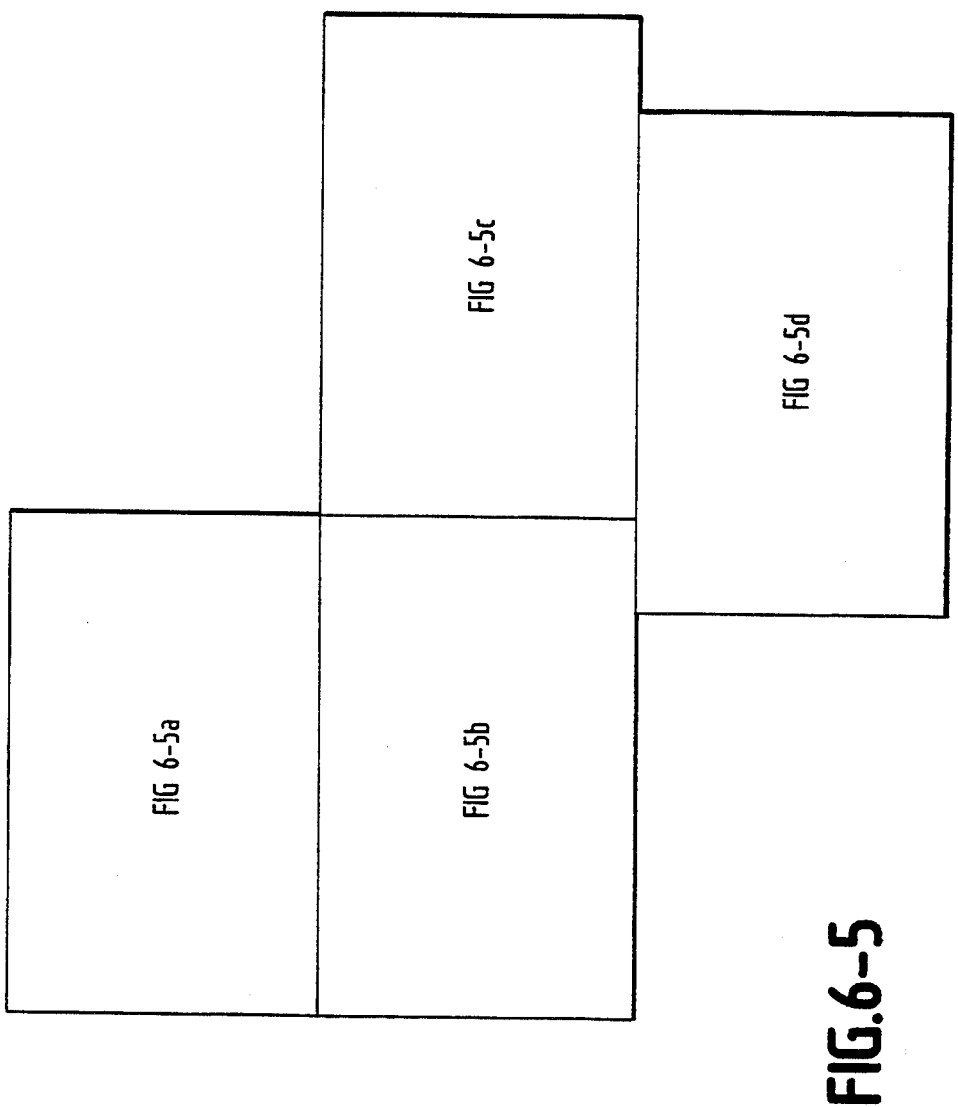
Figure 6:
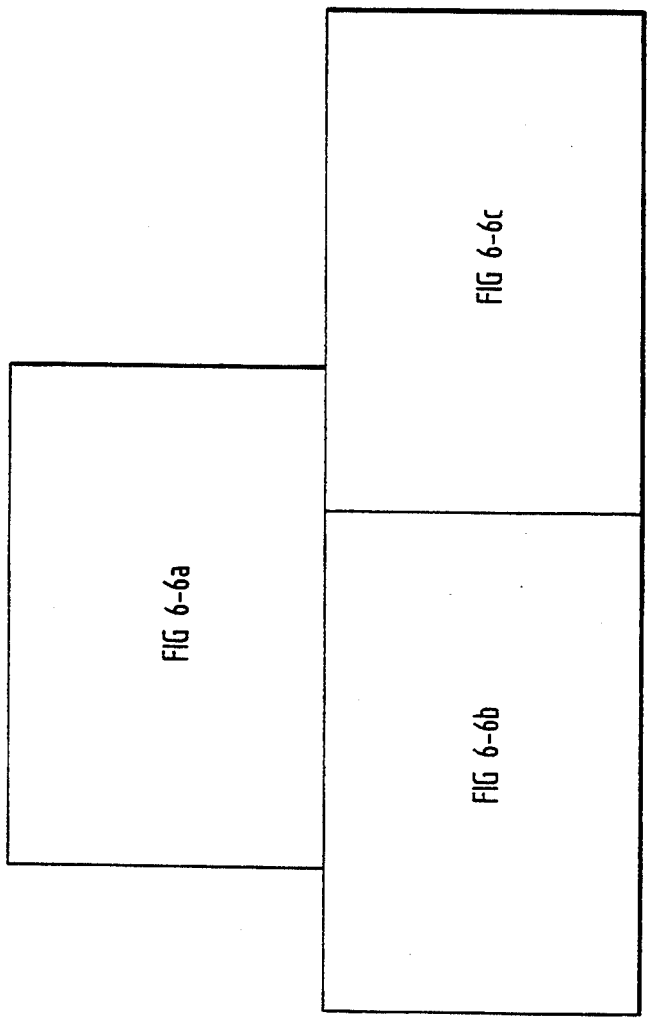
Figures 6, 6C:
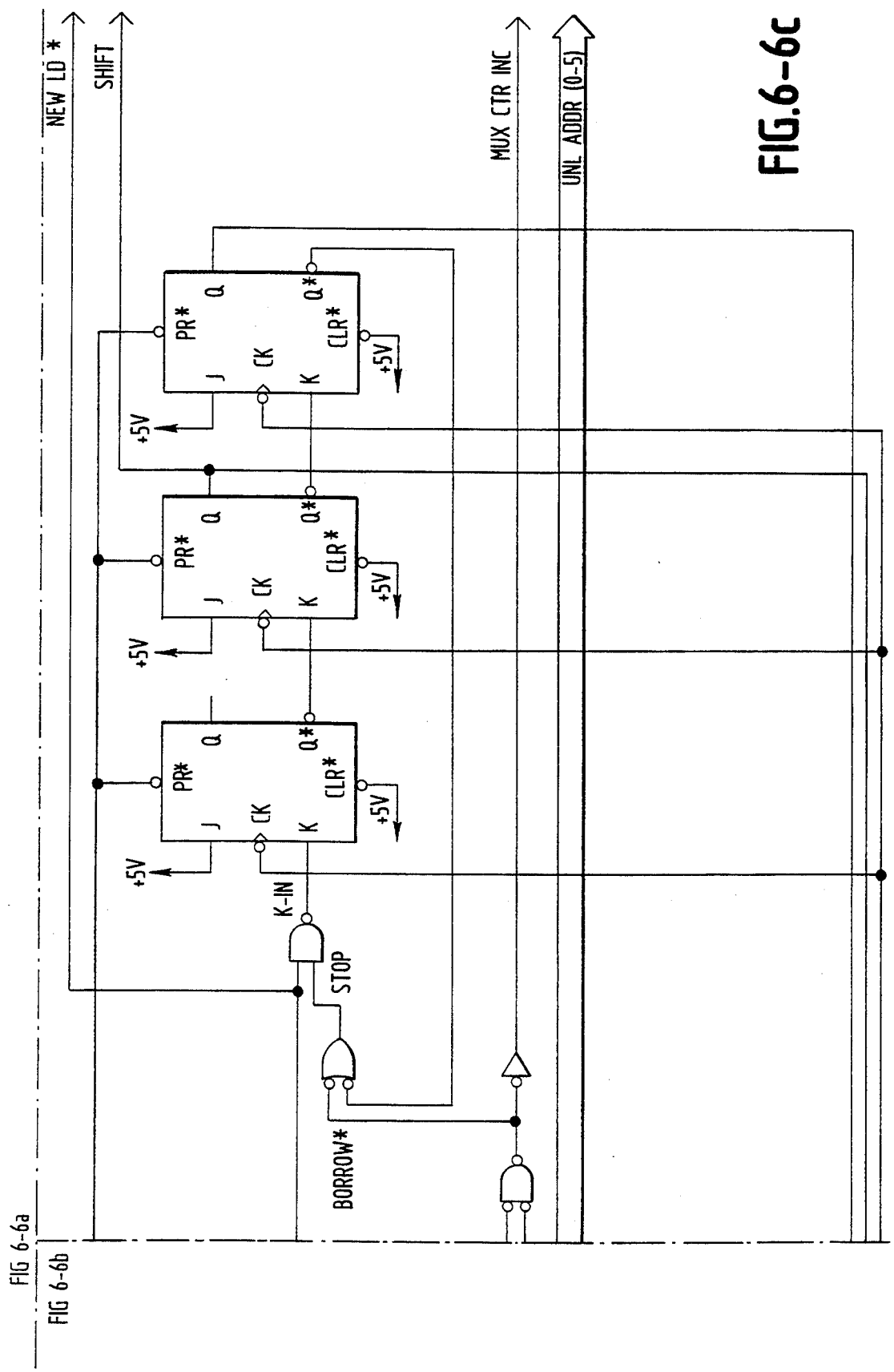
Figures 6, 7:
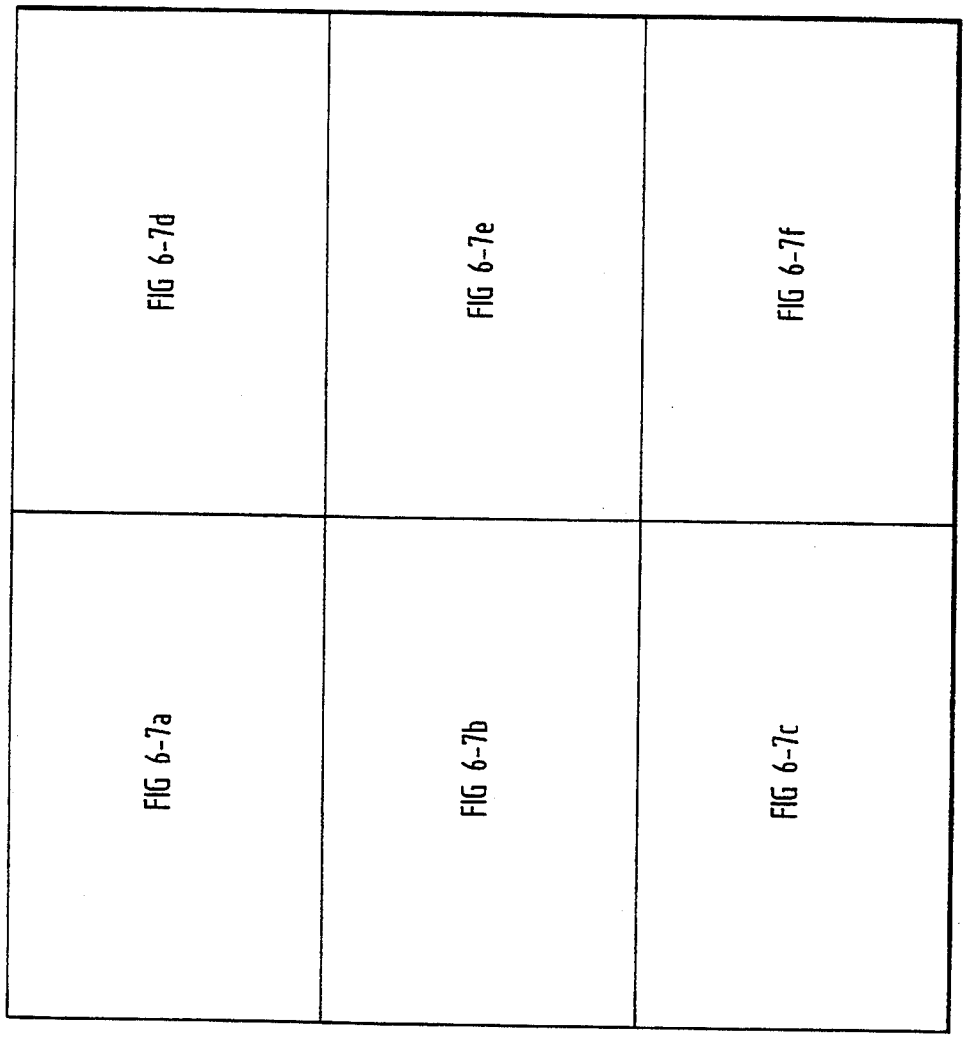
Figures 6, 7, 7A:
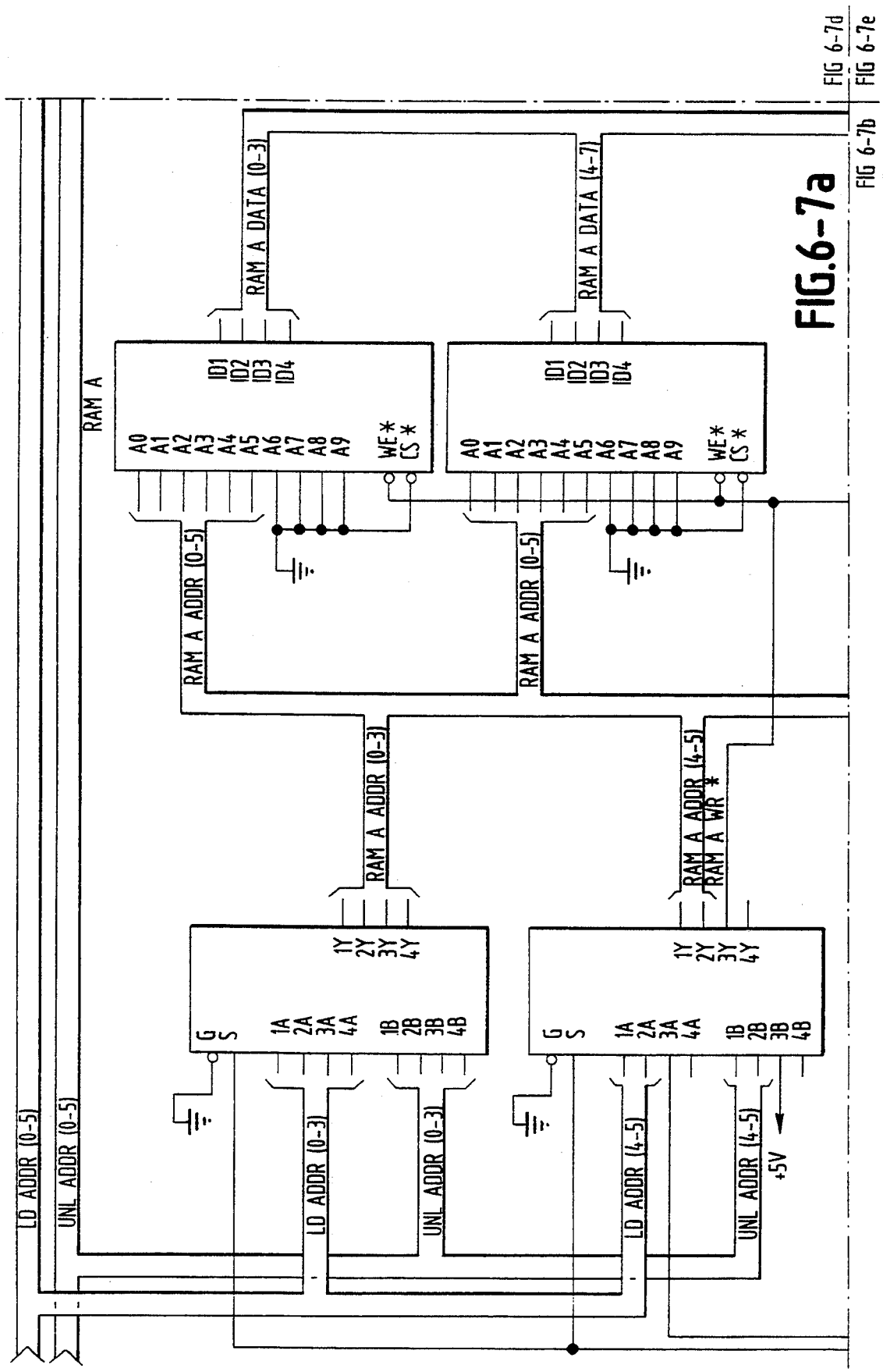
Figures 6, 7, 7B:
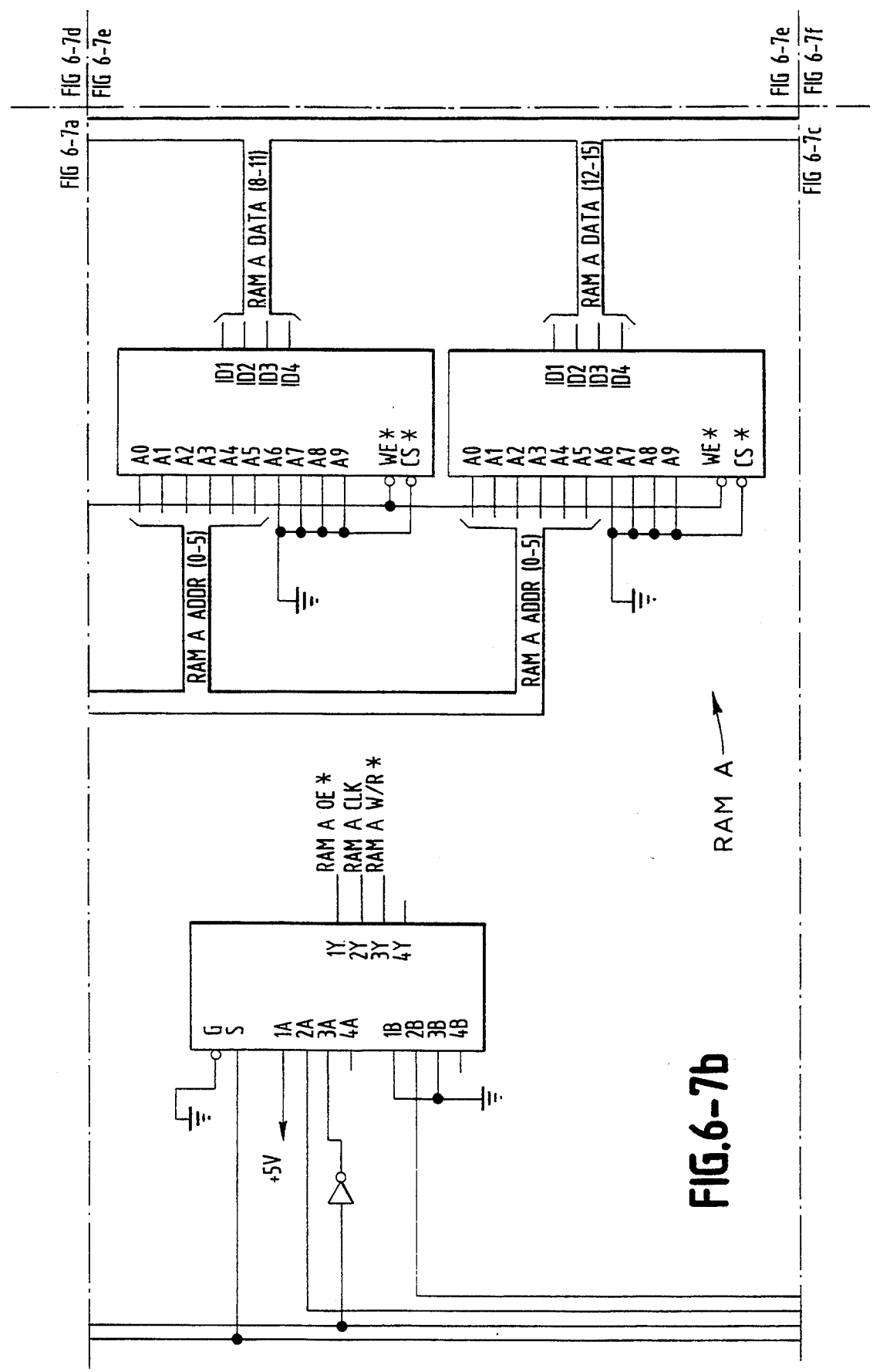
Figures 6, 7, 7D:
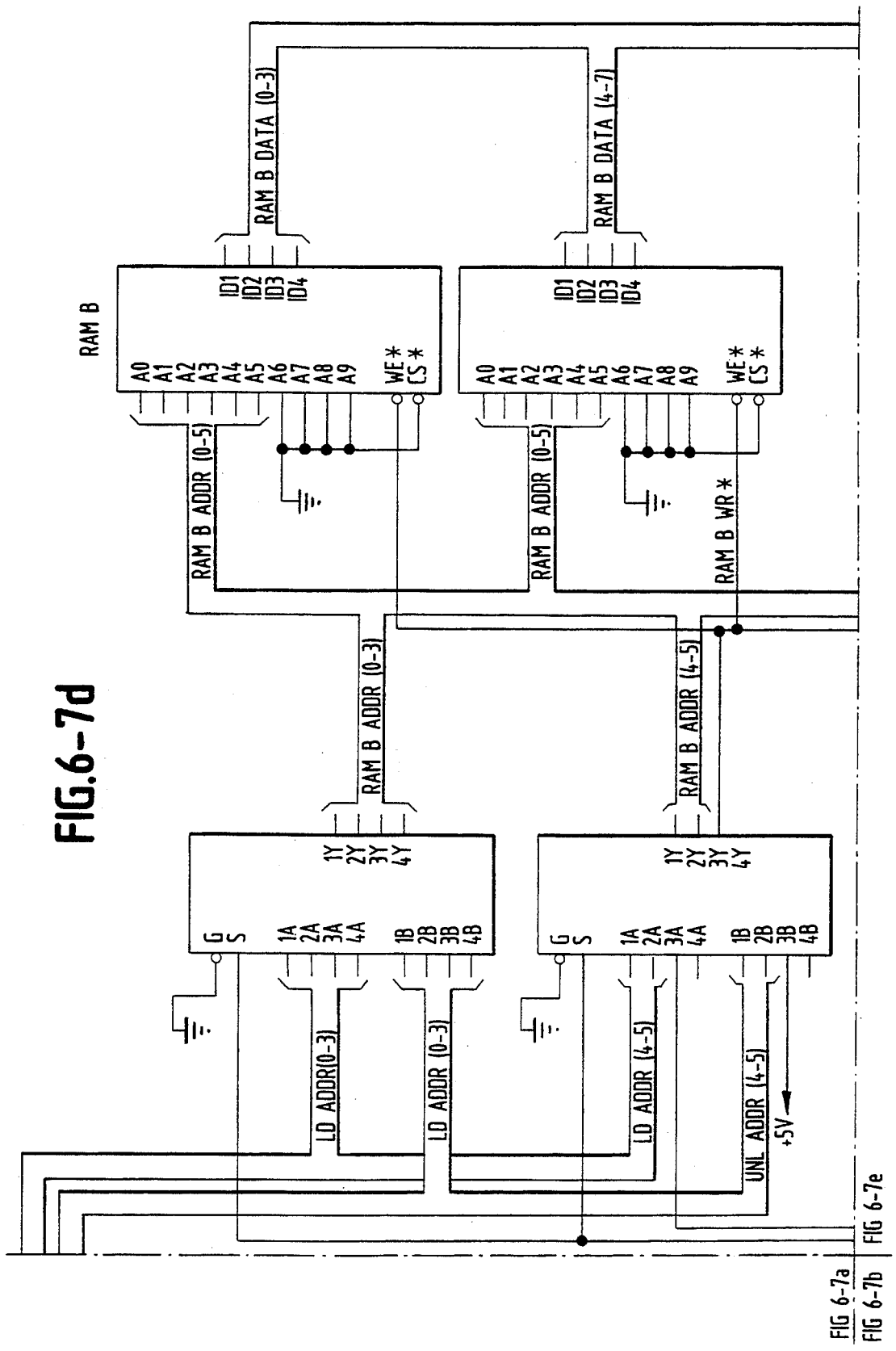
Figures 6, 7, 7E:
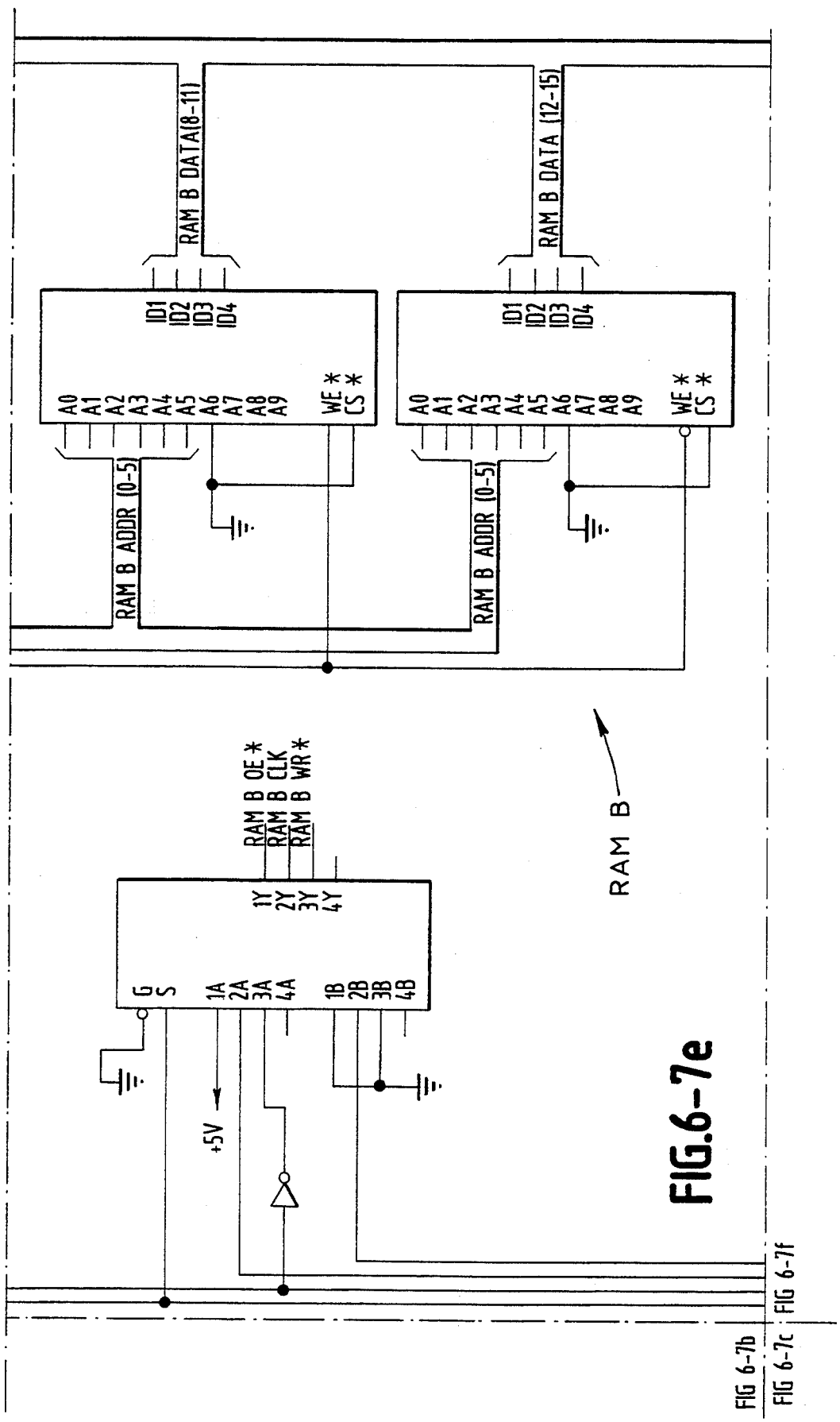

Included amongst these signals are the IPM databus 100 signals which are used to transfer data, commands and status information between the printer's image controller 12 and the raster printhead controller 14. As shown in FIG. 6-2, the IPM databus 100 is coupled to tri-state buffers indicated generally at 52. The outputs of the tri-state buffers 52 are coupled to the RAM banks A and B as shown in FIG. 6-7. The pixel data words of each block from the printer's image controller 12 are transferred over the databus marked as I data and are stored in either RAM bank A or RAM bank B at sequential memory addresses LD ADDR generated by a counter indicated generally at 102 at FIG. 6-5. Once the selected RAM bank has been loaded with the block of pixel data words from the printer's image controller 12, a second counter circuit indicated generally at 104 in FIG. 6-6 generates the sequential addresses UNL ADDR which are used to unload sequential locations in the loaded RAM bank to transfer a vertical block of pixel data words to the two-to-one multiplexer indicated generally at 40 in FIG. 6-8. The output of the two-to-one multiplexer 40 is coupled to the input of the sixteen-to-one multiplexer 42, the output of which is coupled to the input of the 33 bit shift register 44. As previously mentioned, the sixteen-to-one multiplexer 42 selects a bit from the pixel data word provided by the two-to-one multiplexer 40 and transfers the selected bit to the 33 bit shift register 44 which shifts the pixel bit to the output (H DATA) corresponding to the associated print wire driver.

Figures 6, 7, 8:
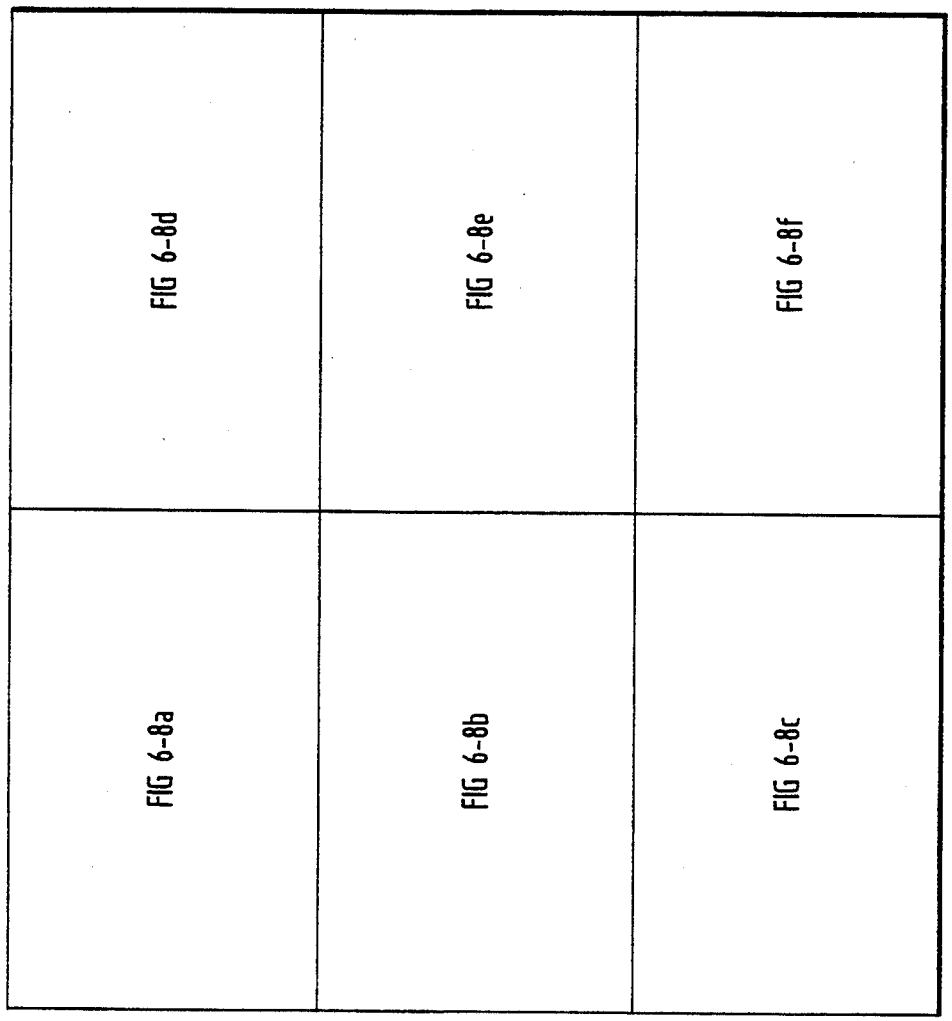
Figures 6, 7, 8, 8B:
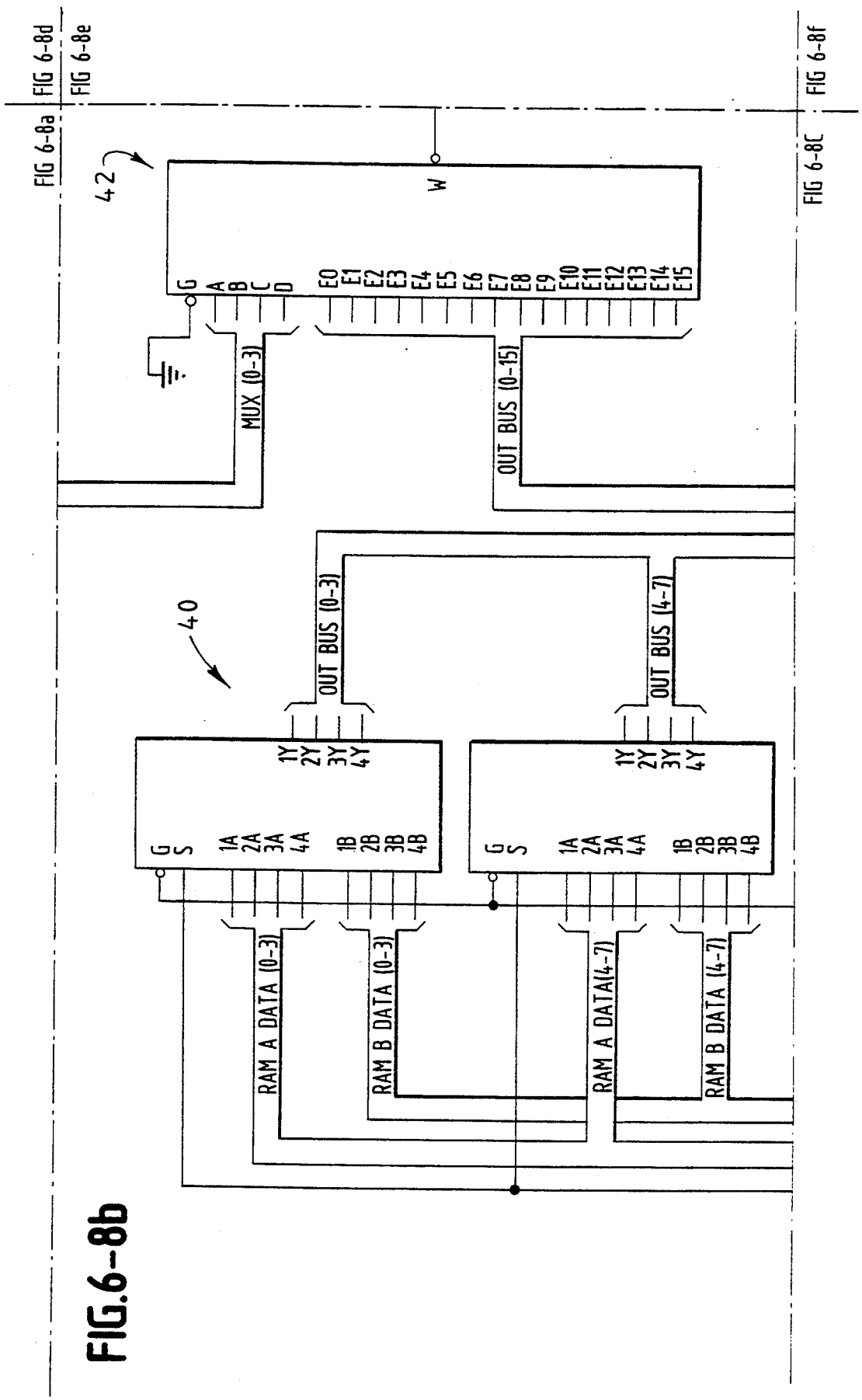
Figures 6, 7, 8, 8D:
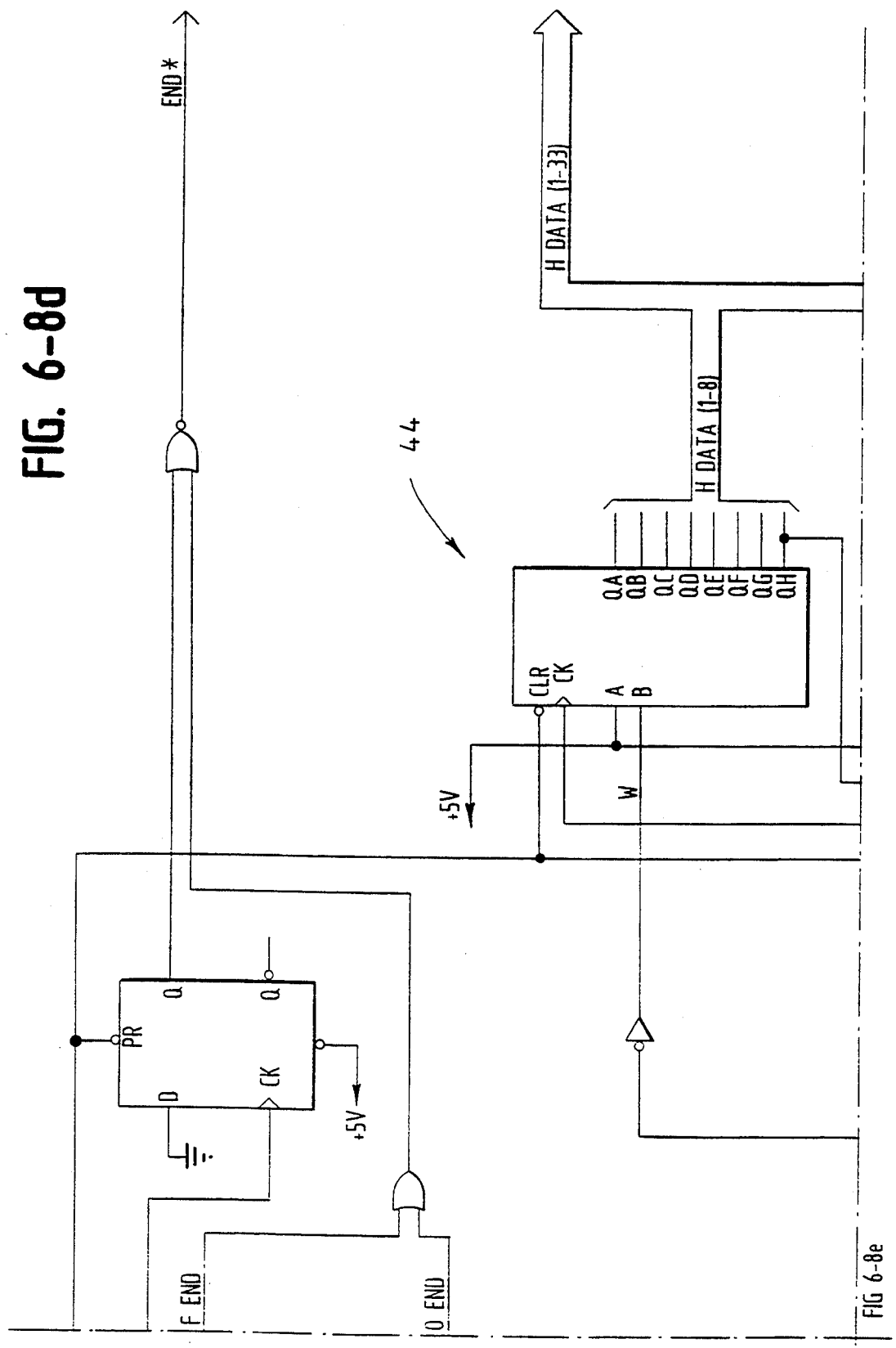
Figures 6, 7, 8, 8E:
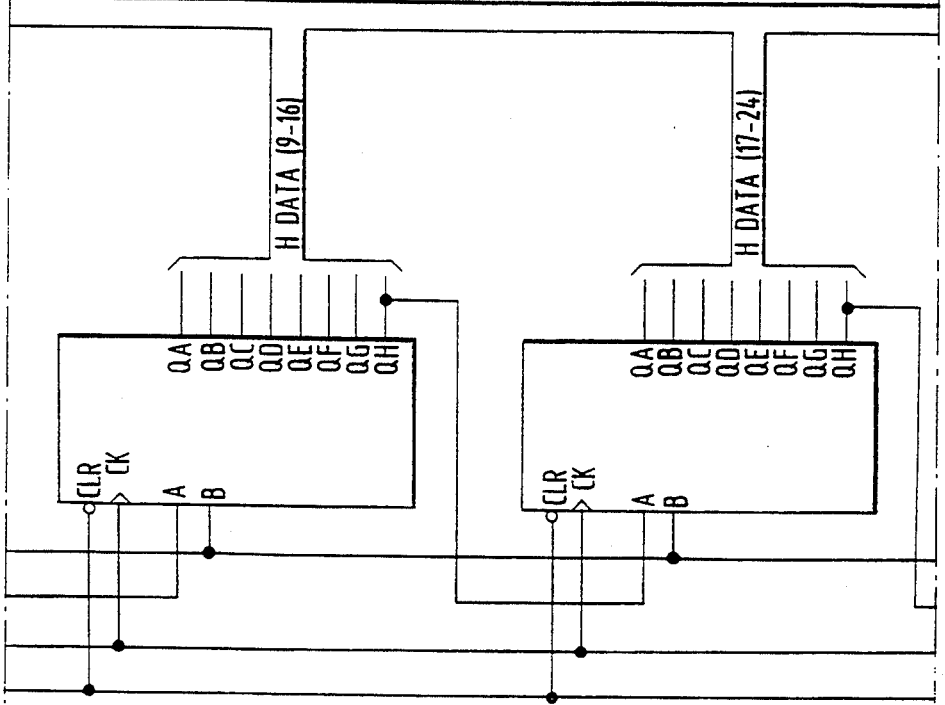
Figures 6, 7, 8, 9:
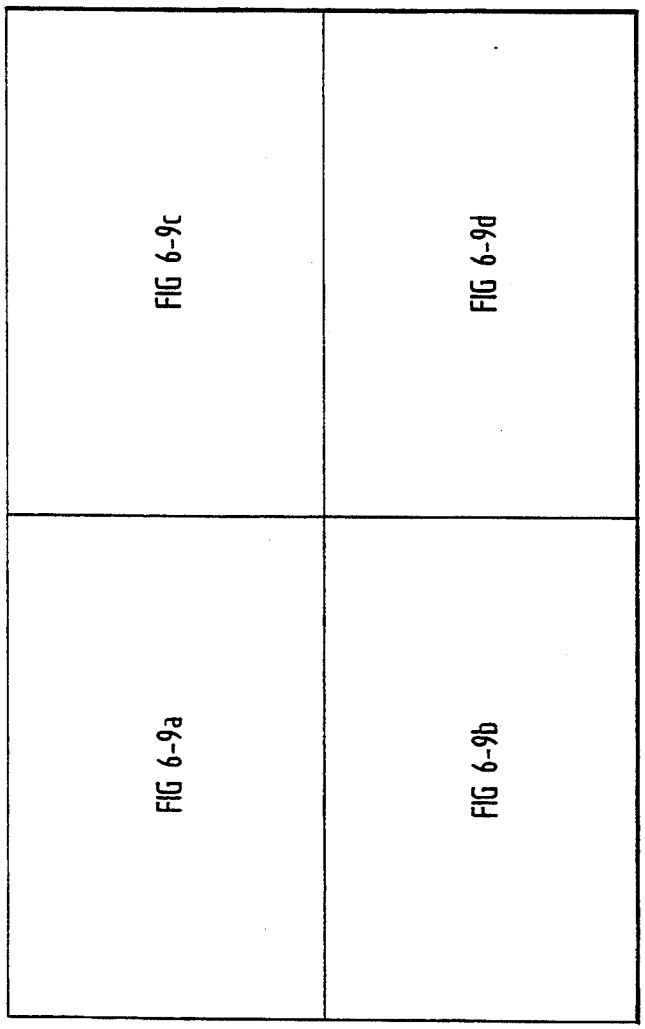
Figures 6, 7, 8, 9, 9C:
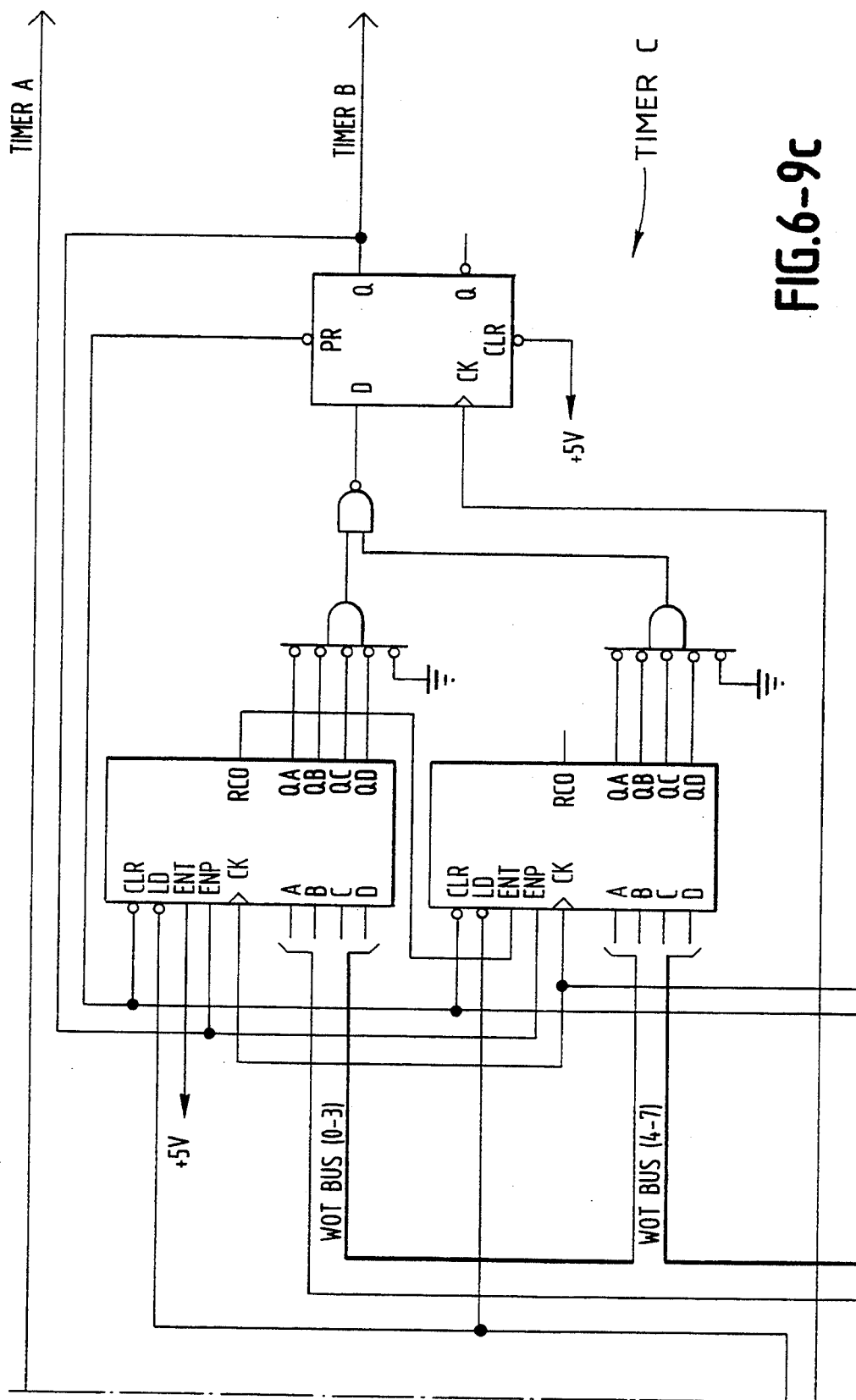
Figures 6, 7, 8, 9, 9D:
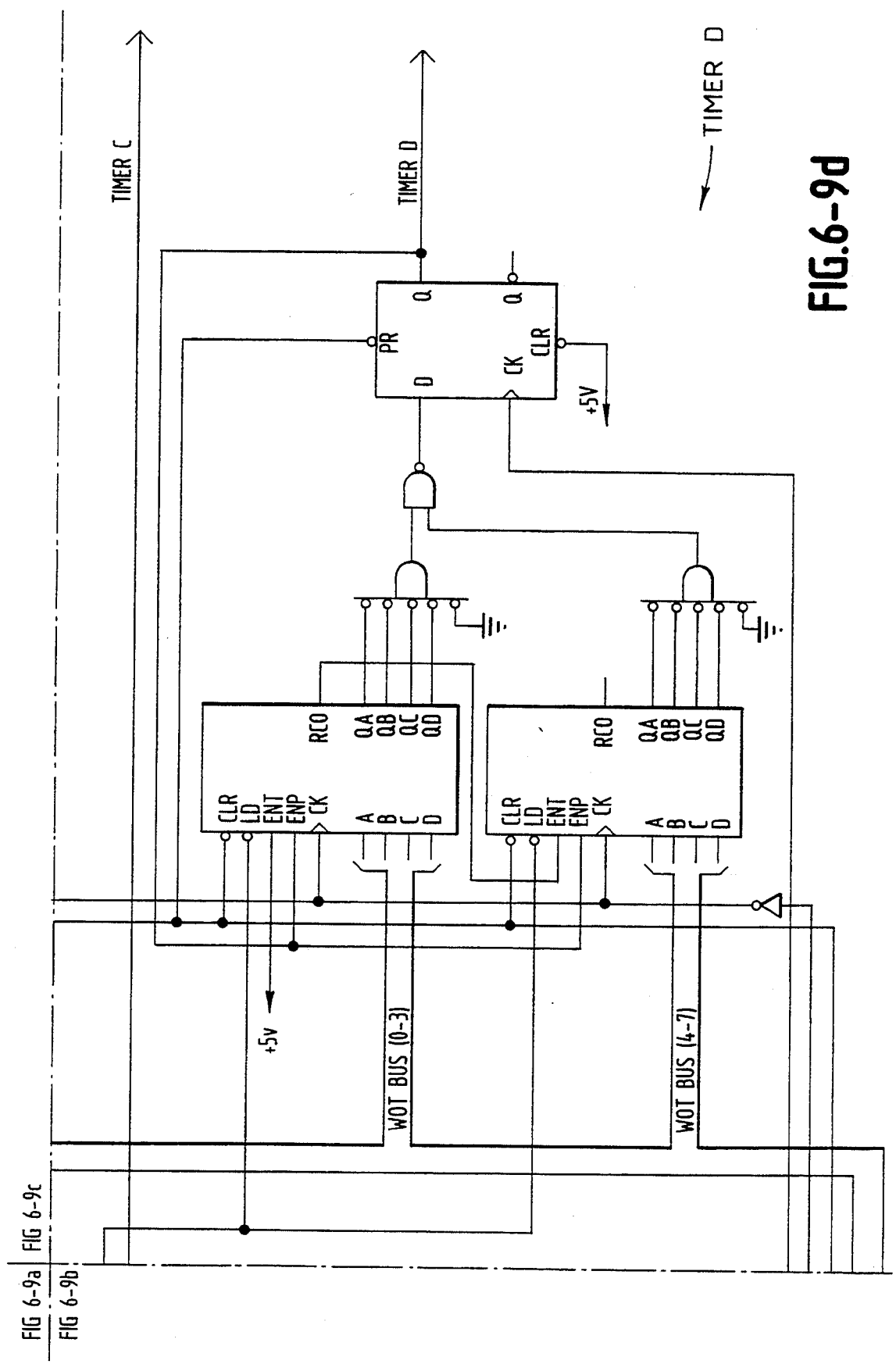
Figures 6, 7, 8, 9, 10:
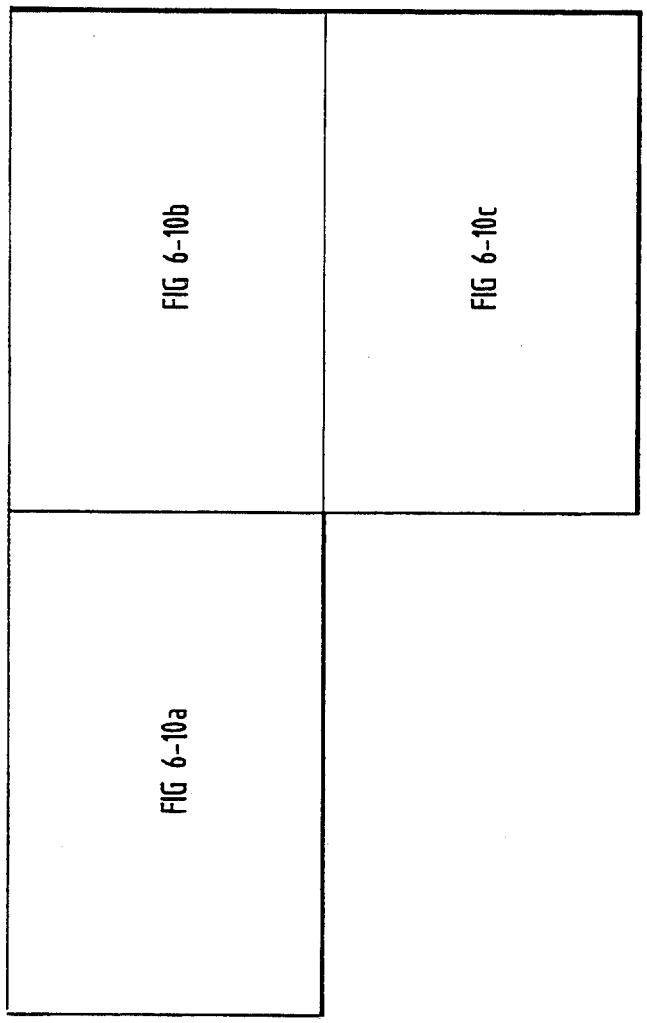
Figures 6, 7, 8, 9, 10, 10A:
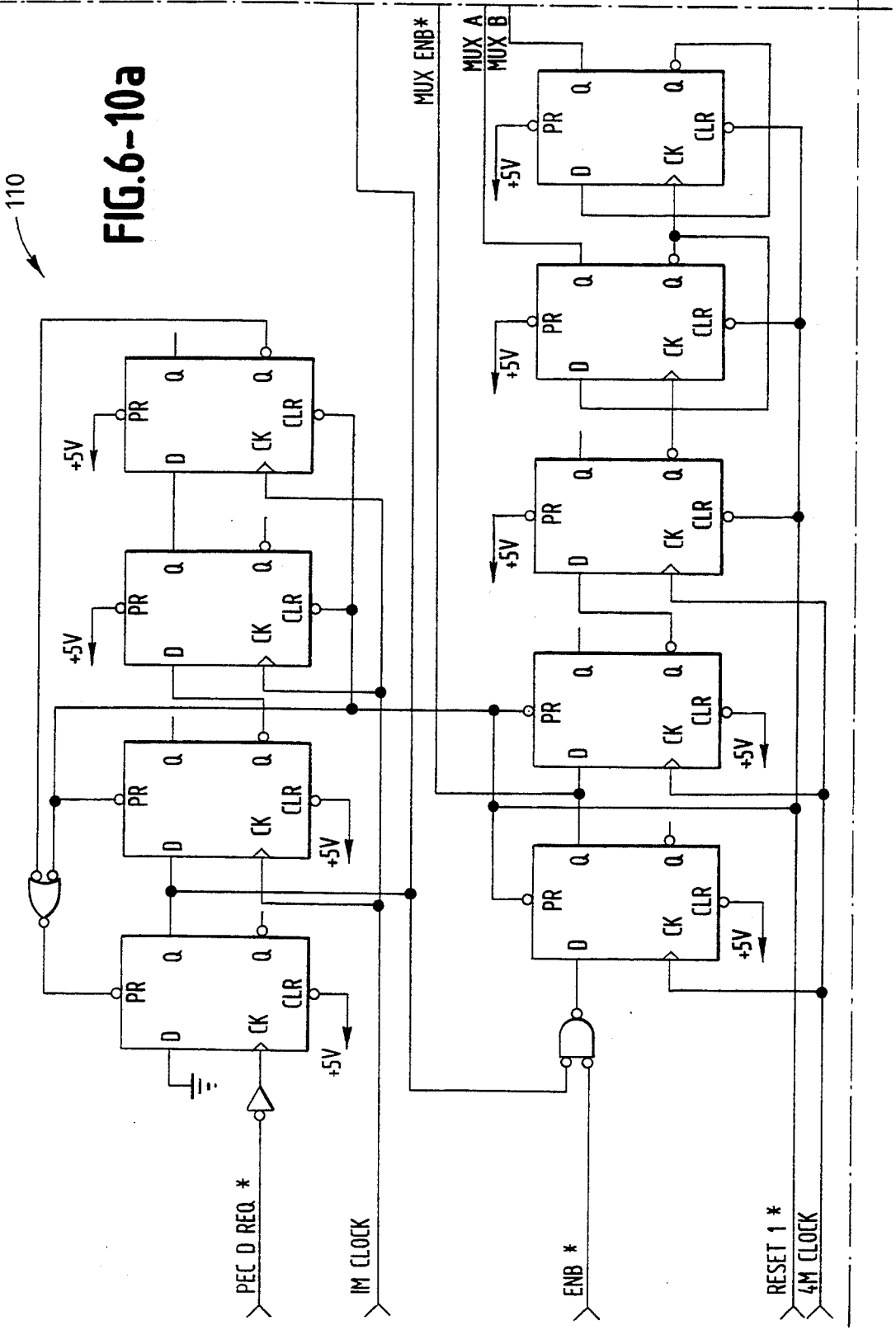
Figures 6, 7, 8, 9, 10, 11:
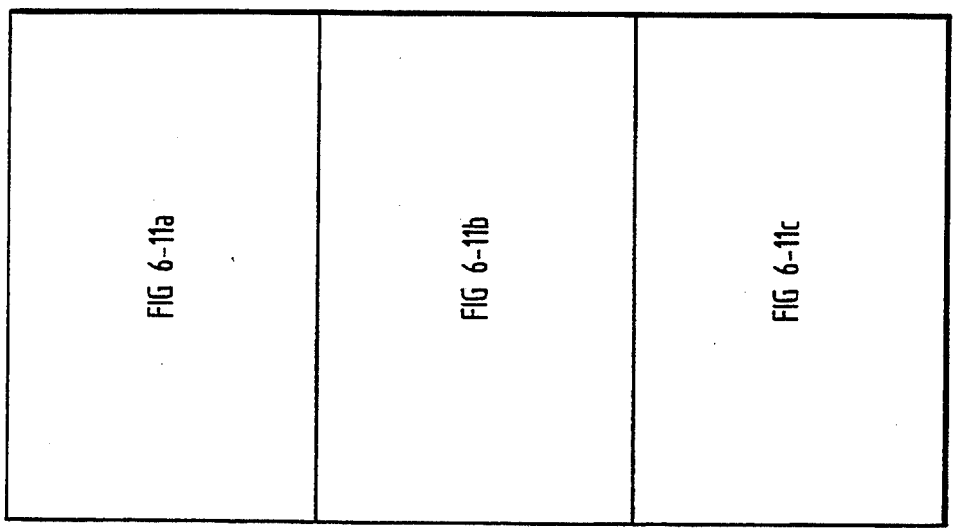
Figures 6, 7, 8, 9, 10, 11, 11C:
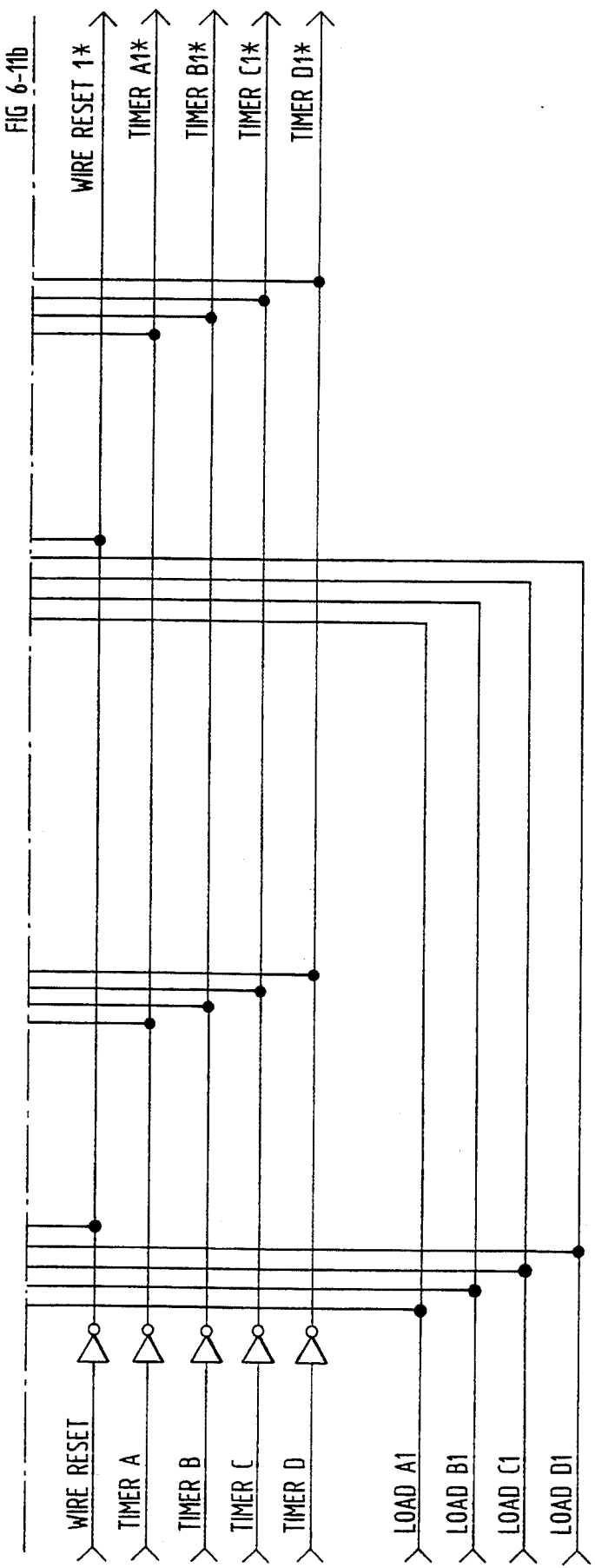

Each of the 33 H DATA outputs of the shift register 44 has an associated latch circuit 46 (FIG. 5), an example of which is indicated at 46(1) for print wire (1) in FIG. 6-10. The latching circuitry 46(1) includes four latches 109, each of which has an input coupled to the pixel data bit output H DATA of the shift register 44 (FIG. 6-8). Each latch circuit 109 of the latch circuitry 46(1) is clocked by a clock circuit 110. The output of each of the four latch circuits 109 is logically ORed by gates 111 with the output of one of the four timer circuits A to D of FIG. 6-9. The timer circuits A to D are provided principally to prevent attempts to fire the print wire two times in a row of consecutive horizontal pixel locations. An AND gate 112 couples the outputs of the each OR gate 111 to provide a drive signal to the print engine controller 16 for print wire (1). The latch circuitry 46(2) to 46(5) is substantially the same for print wires (2) to (5) as shown in FIG. 6-11. The latch circuitry for the remaining pins is also the same and has therefore been omitted.

The raster printhead controller 14 has two status registers indicated at 120 in FIG. 6-4. The contents of these two status registers are set forth in Table 2 below:

TABLE 2

| Status Reg. A | | Wire-On-Timer (WOT)/STATUS_B | |
|---|---|---|---|
| BIT | CONTENTS | BIT | CONTENTS |
| 15 | Load Address Bit 5 | 15 | Error (3) |
| 14 | Load Address Bit 4 | 14 | Error (2) |
| 13 | Load Address Bit 3 | 13 | Error (1) |
| 12 | Load Address Bit 2 | 12 | Error (0) |
| 11 | Load Address Bit 1 | 11 | Mux (3) |
| 10 | Load Address Bit 0 | 10 | Mux (2) |
| 9 | Unload Address Bit 5 | 9 | Mux (1) |
| 8 | Unload Address Bit 4 | 8 | Mux (0) |
| 7 | Unload Address Bit 3 | 7 | WOT Bit 7 |
| 6 | Unload Address Bit 2 | 6 | WOT Bit 6 |
| 5 | Unload Address Bit 1 | 5 | WOT Bit 5 |
| 4 | Unload Address Bit 0 | 4 | WOT Bit 4 |
| 3 | RAM A Loading | 3 | WOT Bit 3 |
| 2 | RPHC_RDY | 2 | WOT Bit 2 |
| 1 | Version Bit 1 | 1 | WOT Bit 1 |
| 0 | Version Bit 0 | 0 | WOT Bit 0 |

As shown therein, the status registers allow the printer's image controller 12 to monitor the load address at which pixel data words are being loaded into the RAM banks and to also monitor the RAM bank addresses at which the pixel data words are being read for conversion to the vertical groups pixel data bits. If an error occurs, the controller 12 can access Status B register to read an error code Error (3)-(1). In addition, a wire on-time value can be loaded by the printer's image controller into a status register to control the timer circuits A to D. In the illustrated embodiment, the firing pulse duration (FPD) has a resolution of 16/clock frequency and an error or 8/clock frequency due to the asynchronous nature of the pin firing pulse (PEC D REQ) from the print engine controller, compared to the system clock of the raster printhead controller 14. The wire on-time value is determined by taking the integer closest to the result of the following formula:

$$WOT \text{ Value} = \frac{FPD * \text{Clock Frequency}}{16} - \frac{1}{4}$$

where FPD is provided in sec. and the clock frequency is in Hertz.

Referring now to FIG. 6-3, the address decoder logic 50 is shown in greater detail. This decoder logic decodes address signals for several input/output functions. When the address (relative address 0) corresponding to function DISABLE RPHC is written to, the raster printhead controller 14 is placed in a disabled mode. Access by the print engine controller 16 is fully disabled and access by the printer's image controller 12 is limited to writing to the wire on-timer register and reading the two status bytes. When the address (relative address 1) corresponding to the ENABLE RPHC function is written to, the raster printhead controller 14 is placed in its enable mode. The printer's image controller 12 has read and write access, to all valid locations. Reading from the address (relative address 2) corresponding to the STATUS A-Read function, outputs the current status word onto the data bus. Reading from the address location (relative address 3) corresponding to the WIRE ON-TIMER/STATUS B-Read/write outputs the current Status B word onto the data bus. Writing to this location will write the lower byte of the data bus into the wire on-timer register. Addressing the address (relative address 4) corresponding to the RAM DATA-Read/Write location will, depending upon the state of the signal I RD WT* (Table 1), write data to the current location of the currently selected RAM or read data from the currently selected RAM.

When the address (relative address 5) is written to or read from which corresponds to the function SWITCH RAM, the RAM which is set up to receive data is switched to output its data. Addressing the location (relative address 6) corresponding to ADDRESS RESET, will reset both the load address and unload addresses to zero so that the next read and write operations will start at the first RAM address. Finally, addressing the location (relative address 7) corresponding to ERROR RESET, resets the error bit. The decode circuitry 50 further includes additional decoding circuitry indicated at 130 which defines the more specific input/output functions: STATUS READ*, SWITCH RAM*, ADDR RESET*, ERROR RESET*, READ RAM*, WOT READ*, WRITE RAM*, WOT WRITE*, WRITE RAM LONG*, ENABLE IO* and DIR.

OPERATION

When power is first applied to the raster printhead controller 14, in the printer's image controller 12 issues the IPM RESET* signal (Table 1, FIG. 6-2), and the raster printhead controller 14 will be in its disabled state by reset drivers 200. At this point in time, the only valid access is to read the two status registers, to write the wire on-timer (WOT) value into the status B register and to write to the ENABLE RPHC address (relative address 1) to place the raster printhead controller 14 into its enabled mode. All the other registers, timers and counters are held in a reset condition.

When the raster printhead controller 14 is enabled, the first of the two RAM banks (e.g., RAM bank A) is ready to receive the first block of 33 pixel data words.

Accordingly, the raster printhead controller 14 issues the BUF EMPTY* signal (Table 1, FIG. 6-5) from logic circuitry 210 to the printer's image controller 12 and then waits for the controller 12 to send the data.

When the first pixel data word is received, the buffer empty signal BUF EMPTY* will go inactive. After all 33 pixel data words (i.e., an entire vertical block) are sent to the raster printhead controller 14, an internal flag is set and the RPHC RDY signal (Table 1, FIG. 6-3) from logic circuitry 212 will go active. If a 34th word is sent after this flag is set, the ERROR* signal (Table 1, FIG. 6-5) of logic circuitry 214 will go active until an ERROR RESET (FIG. 6-3) command is received from the controller 12. The raster printhead controller 14 will remain in this state until the print engine controller 16 issues a firing pulse PEC D REQ (Table 1, FIG. 6-2) to the raster printhead controller 14. When the first firing pulse of the print scan is received, none of the wire drivers will go active. Receipt of the firing pulse switches the RAM bank (e.g., RAM bank A) that was just loaded so that it can be unloaded, and also allows the other RAM bank (e.g., RAM bank B) to be loaded by enabling the BUF EMPTY* signal.

As previously mentioned, one bit of each pixel data word currently being unloaded from the RAM bank is then shifted by the shift register 44 (FIG. 6-8) to the corresponding latch 46 (FIGS. 6-10, 6-11) of the associated print wire. In a left to right scan, the most significant bit (MSB) of each pixel data word of the block is selected first. If, however, the printhead is scanning from right-to-left as indicated by the DIRECTION signal (Table 1, FIG. 6-2) from the printer's image controller 12, the least significant bit (LSB) of each word is first shifted to the latches rather 46 than the most significant bit.

When the next firing pulse is received, the data that was just shifted to the latches is latched in place and the first timer of the timers A to D is loaded from the wire on-time register value and is started. The output of the latches 46 is logically ORed together with the timer and together they drive the pin drivers. This second firing pulse also starts the shifting of the next bit into the next input side of the latches, the contents of which are output on the next firing pulse. This process continues until all sixteen columns or groups of data contained within the vertical block of 33 pixel data words have been printed.

By the time the sixteenth column of pixel data bits has been output, the printer's image controller 12 will have loaded the next vertical block of pixel data words into the available RAM bank. When the last column of pixel data bits is shifted out and the other RAM has been loaded, the RAM banks will switch. This process continues until no more firing pulses are received. The buffer currently unloading the last block of data may or may not be emptied completely. The controller 12 waits until all the pin drivers have become inactive. This condition can be calculated from the value of the wire on-timer. The controller 12 then places the raster printhead controller 14 in its inactive mode to reset the device to a known state.

It can be appreciated from the above that the raster printhead controller is readily adaptable to a variety of different print engines, having different printheads including ink jet printheads. For example, if the member of print elements of the printhead differs from 33, the number of pixel data words accessed in each vertical block is varied accordingly so that the raster printhead controller provides a column of pixel data bits which correspond to the number of print elements of printhead. Also, the raster printhead controller can be adapted to printheads having vertically displaced print elements which are also displaced somewhat horizontally, i.e., slanted.

It will, of course, be understood that further modifications of the present invention, in its various aspects, will be apparent to those skilled in the art, some being apparent only after study and others being matters of routine electronic and mechanical design. Other embodiments are also possible, their specific designs depending upon the particular application. As such, the scope of the invention should not be limited by the particular embodiment hereindescribed but should be defined only by the appended claims and equivalents thereof.

What is claimed is:

1. A printer having a printhead for printing an image onto a printing medium as the printhead makes a plurality of substantially horizontal passes across the printing medium, the printhead including a plurality of printing elements each of which is vertically displaced relative to its adjacent printing elements wherein the printhead has n printing elements and makes p passes over the printing medium in order to print the image; the improvement comprising:

(a) first means for generating and storing a bit mapped raster matrix of an image to be printed wherein the first means includes a matrix memory means for storing the bits of the bit mapped raster matrix, wherein each column of the matrix memory is logically divided into at least p adjacent groups corresponding to the p passes of the printhead, and each group includes n consecutive bits corresponding to the n printing elements; and (b) second means for accessing from the bit mapped raster matrix a group of bits corresponding in number to the number of printing elements of the print head to drive the printing elements of the printhead so as to print the image, said second means including control means for sequentially accessing, for each pass of the printhead, the group in each column corresponding to the pass, and applying the bits of the group to the corresponding printing elements, said control means including a shift register for storing said group of bits, said shift register having a plurality of outputs, each output being coupled to a printing element.

2. A printer having a printhead including a vertical array or vertically slanted array of n printing elements, for printing at least one character line onto a printing medium as the printhead is shuttled across the medium in a scan direction, the improvement comprising:

(a) a first memory for storing a bit mapped raster matrix of at least one character line to be printed, the memory including at least one segment comprised of:

(1) n rows corresponding to the n printing elements; and (2) a plurality of columns, each column including n words corresponding to the n printing elements, each word comprising m bits;

(b) a second memory comprised of:

(1) n rows corresponding to the n printing elements; and (2) m 1-bit columns corresponding to the m bits of a word;

(c) a third memory comprising at least n 1-bit cells corresponding to the n printing elements;

(d) a control means for:

(1) sequentially transferring the words from each column of the first memory to corresponding positions in the second memory, beginning with a first column in the first memory as determined by the scan direction of the printhead and thereafter in accordance with column position;

(2) for each column of words transferred in (1), sequentially transferring the bits from each column of second memory to the corresponding cells in the third memory, beginning with a first column in the second memory as determined by the scan direction of the printhead and thereafter in accordance with column position; and (3) for each column of bits transferred in (2), feeding the bits from the third memory to the corresponding printing elements.

3. The printer of claim 2 wherein:

(a) the first memory means includes a plurality of segments, one segment corresponding to each character line to be printed; and (b) the control means sequentially operates on each segment in accordance with segment position.

4. The printer of claim 3 wherein:

(a) the first memory comprises a random access memory, (b) the second memory comprises a random access memory, and (c) the third memory comprises an n-bit shift register.

5. The printer of claim 2 further including n latches corresponding to the cells of the third memory, and the control means further includes means for latching the contents of the cells of the third memory into the corresponding latches.

6. The printer of claim 5 wherein the second memory includes two separate memory banks, each comprised of:

(1) n rows corresponding to the n printing elements, and (2) m 1-bit columns corresponding to the m bits of a word; and wherein the control means alternates transferring of the n words from columns of the first memory between the two banks.

* * * * *